US012688223B2

(12) United States Patent
Kim et al.

(10) Patent No.: US 12,688,223 B2
(45) Date of Patent: *Jul. 21, 2026

(54) METHOD AND APPARATUS FOR SUMMARIZING DOCUMENT BASED ON DOCUMENT RETRIEVAL

(71) Applicant: 42Maru Inc., Seoul (KR)

(72) Inventors: Dong Hwan Kim, Seoul (KR); Hyun Wuk Son, Suwon-si (KR); Hyun Ok Kim, Gwangmyeong-si (KR); You Kyung Kwon, Seoul (KR); In Je Seong, Seoul (KR); Yong Sun Choi, Seoul (KR); Ha Kyeom Moon, Seoul (KR)

(73) Assignee: 42Maru Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/074,568

(22) Filed: Mar. 10, 2025

(65) Prior Publication Data

US 2025/0209106 A1     Jun. 26, 2025

Related U.S. Application Data

(63) Continuation of application No. 18/071,105, filed on Nov. 29, 2022, now Pat. No. 12,259,917.

(30) Foreign Application Priority Data

Nov. 18, 2022     (KR) ........................ 10-2022-0155113

(51) Int. Cl.
G06F 16/34      (2019.01)
G06F 16/334     (2025.01)
G06F 16/35      (2019.01)

(52) U.S. Cl.
CPC ........ G06F 16/345 (2019.01); G06F 16/3347 (2019.01); G06F 16/35 (2019.01)

(58) Field of Classification Search
CPC ..... G06F 16/345; G06F 16/3347; G06F 16/35
See application file for complete search history.

(56) References Cited

U.S. PATENT DOCUMENTS

| 11,170,158 B2 | 11/2021 | Cohan |
| 2015/0026106 A1 | 1/2015 | Oh |

(Continued)

OTHER PUBLICATIONS

U.S. Appl. No. 18/071,105, filed Nov. 29, 2022.

(Continued)

*Primary Examiner* — Jensen Hu
(74) *Attorney, Agent, or Firm* — USX IP LLC

(57)     ABSTRACT

A method of retrieving a document according to an embodiment of the present application includes: acquiring a user retrieval query; calculating a user inquiry vector in a unit of sentence from the user retrieval query and acquiring a first document candidate group based on similarity between the calculated user inquiry vector and an embedding vector of a document stored in a retrieval database; acquiring a second document candidate group based on similarity between a text included in the user retrieval query and a text of the document stored in the retrieval database; and determining a summarization target document based on the first document candidate group and the second document candidate group.

13 Claims, 13 Drawing Sheets

(56) References Cited

U.S. PATENT DOCUMENTS

| | | | |
|---|---|---|---|
| 2015/0120720 A1 | 4/2015 | Dhara | |
| 2017/0351677 A1 | 12/2017 | Chaubal | |
| 2018/0260472 A1 | 9/2018 | Kelsey | |
| 2018/0336183 A1 | 11/2018 | Lee | |
| 2020/0050636 A1 | 2/2020 | Datla | |
| 2020/0202194 A1 | 6/2020 | Wu | |
| 2020/0311738 A1 | 10/2020 | Gupta | |
| 2020/0372025 A1 | 11/2020 | Yoon | |
| 2020/0401627 A1 | 12/2020 | Liu | |
| 2021/0295822 A1 | 9/2021 | Tomkins | |
| 2021/0303796 A1 | 9/2021 | Elsahar | |
| 2022/0269713 A1 | 8/2022 | Wang | |
| 2022/0391756 A1* | 12/2022 | Simard | G06V 10/25 |
| 2023/0131259 A1* | 4/2023 | Lee | G06N 3/08 |
| | | | 706/12 |
| 2023/0140338 A1 | 5/2023 | Hwang | |

OTHER PUBLICATIONS

Sheng-Chieh Lin et al., "Distilling Dense Representations for Ranking using Tightly-Coupled Teachers," arXiv:2010.11386v1 [cs.IR], (Oct. 22, 2020).

Yanzhao Zhang et al., "HLATR: Enhance Multi-stage Text Retrieval with Hybrid List Aware Transformer Reranking," arXiv:2205.10569v1 [cs.IR], (May 21, 2022).

Office Action issued by the Korean Intellectual Property Office on Aug. 6, 2025, in counterpart Korean Patent Application No. 10-2022-0155113.

* cited by examiner

S1000

EXTRACT SUMMARIZATION TARGET DOCUMENT BASED ON USER RETRIEVAL QUERY

S2000

ACQUIRE ABSTRACTIVE SUMMARIZATION-BASED SUMMARY FROM EXTRACTED SUMMARIZATION TARGET DOCUMENT THROUGH DOCUMENT SUMMARIZATION MODEL FOR WHICH TRAINING HAS BEEN COMPLETED

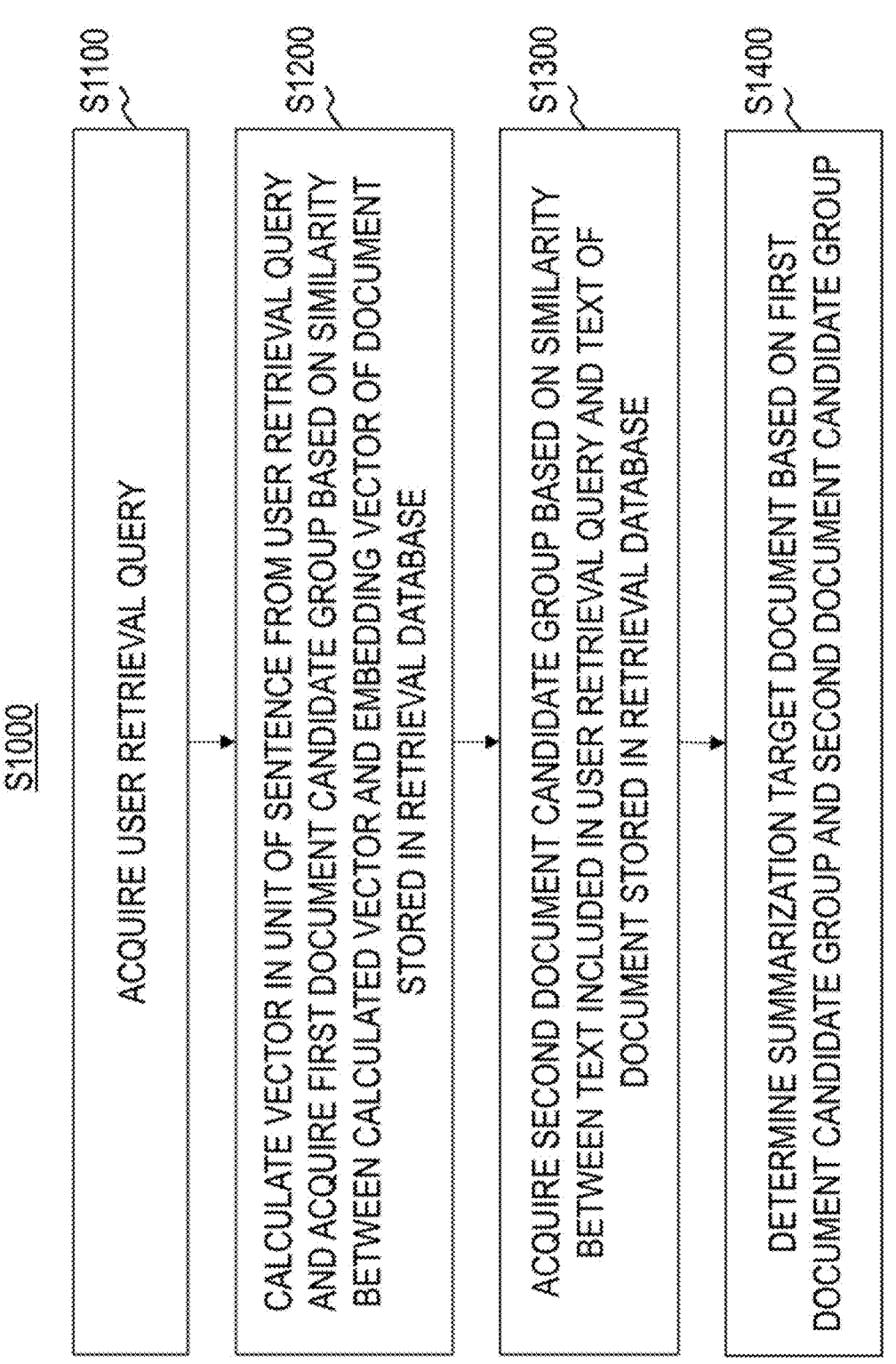

S1000

S1100

ACQUIRE USER RETRIEVAL QUERY

S1200

CALCULATE VECTOR IN UNIT OF SENTENCE FROM USER RETRIEVAL QUERY AND ACQUIRE FIRST DOCUMENT CANDIDATE GROUP BASED ON SIMILARITY BETWEEN CALCULATED VECTOR AND EMBEDDING VECTOR OF DOCUMENT STORED IN RETRIEVAL DATABASE

S1300

ACQUIRE SECOND DOCUMENT CANDIDATE GROUP BASED ON SIMILARITY BETWEEN TEXT INCLUDED IN USER RETRIEVAL QUERY AND TEXT OF DOCUMENT STORED IN RETRIEVAL DATABASE

S1400

DETERMINE SUMMARIZATION TARGET DOCUMENT BASED ON FIRST DOCUMENT CANDIDATE GROUP AND SECOND DOCUMENT CANDIDATE GROUP

FIG. 7

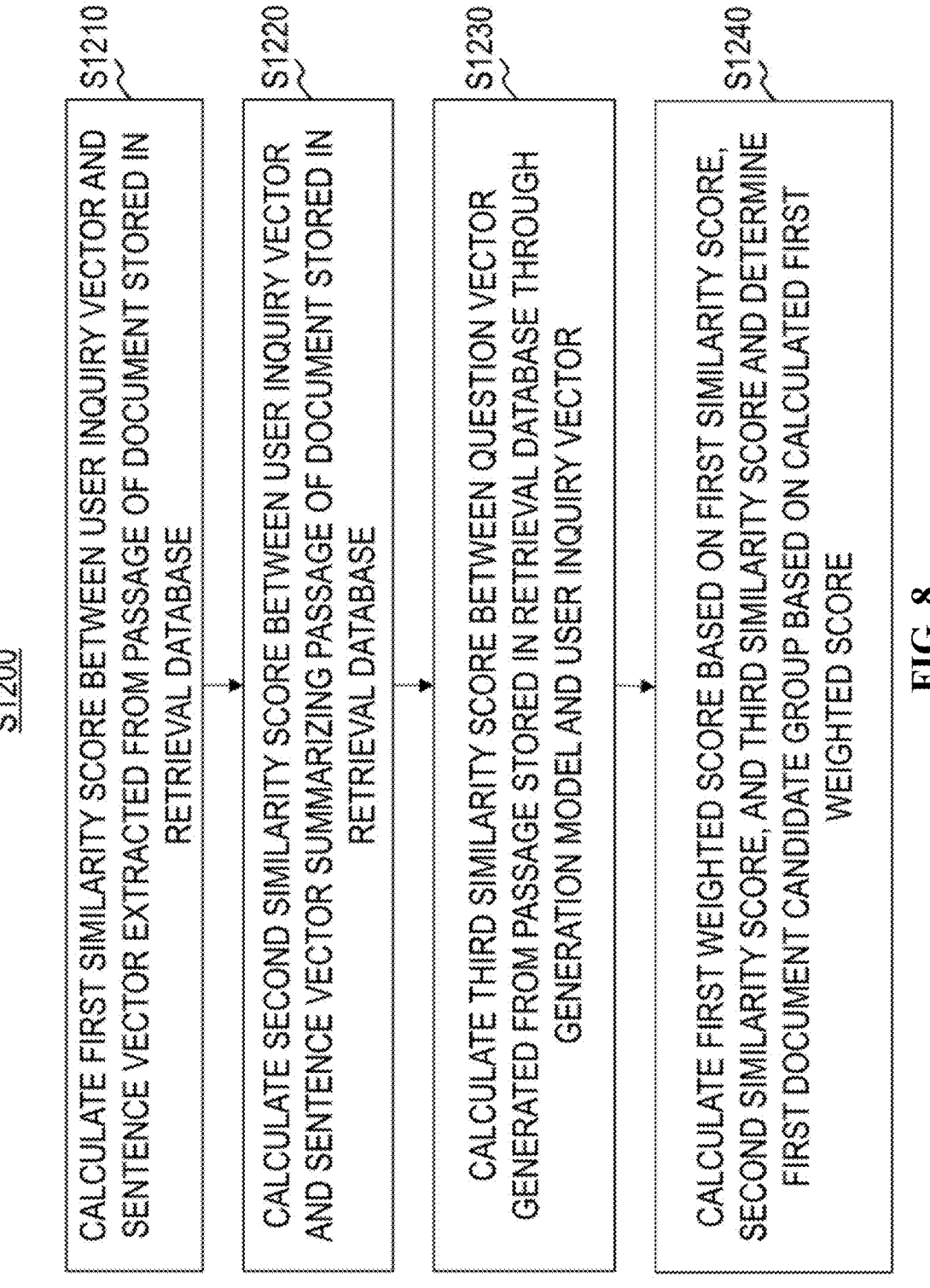

S1200

CALCULATE FIRST SIMILARITY SCORE BETWEEN USER INQUIRY VECTOR AND SENTENCE VECTOR EXTRACTED FROM PASSAGE OF DOCUMENT STORED IN RETRIEVAL DATABASE

S1210

CALCULATE SECOND SIMILARITY SCORE BETWEEN USER INQUIRY VECTOR AND SENTENCE VECTOR SUMMARIZING PASSAGE OF DOCUMENT STORED IN RETRIEVAL DATABASE

S1220

CALCULATE THIRD SIMILARITY SCORE BETWEEN QUESTION VECTOR GENERATED FROM PASSAGE STORED IN RETRIEVAL DATABASE THROUGH GENERATION MODEL AND USER INQUIRY VECTOR

S1230

CALCULATE FIRST WEIGHTED SCORE BASED ON FIRST SIMILARITY SCORE, SECOND SIMILARITY SCORE, AND THIRD SIMILARITY SCORE AND DETERMINE FIRST DOCUMENT CANDIDATE GROUP BASED ON CALCULATED FIRST WEIGHTED SCORE

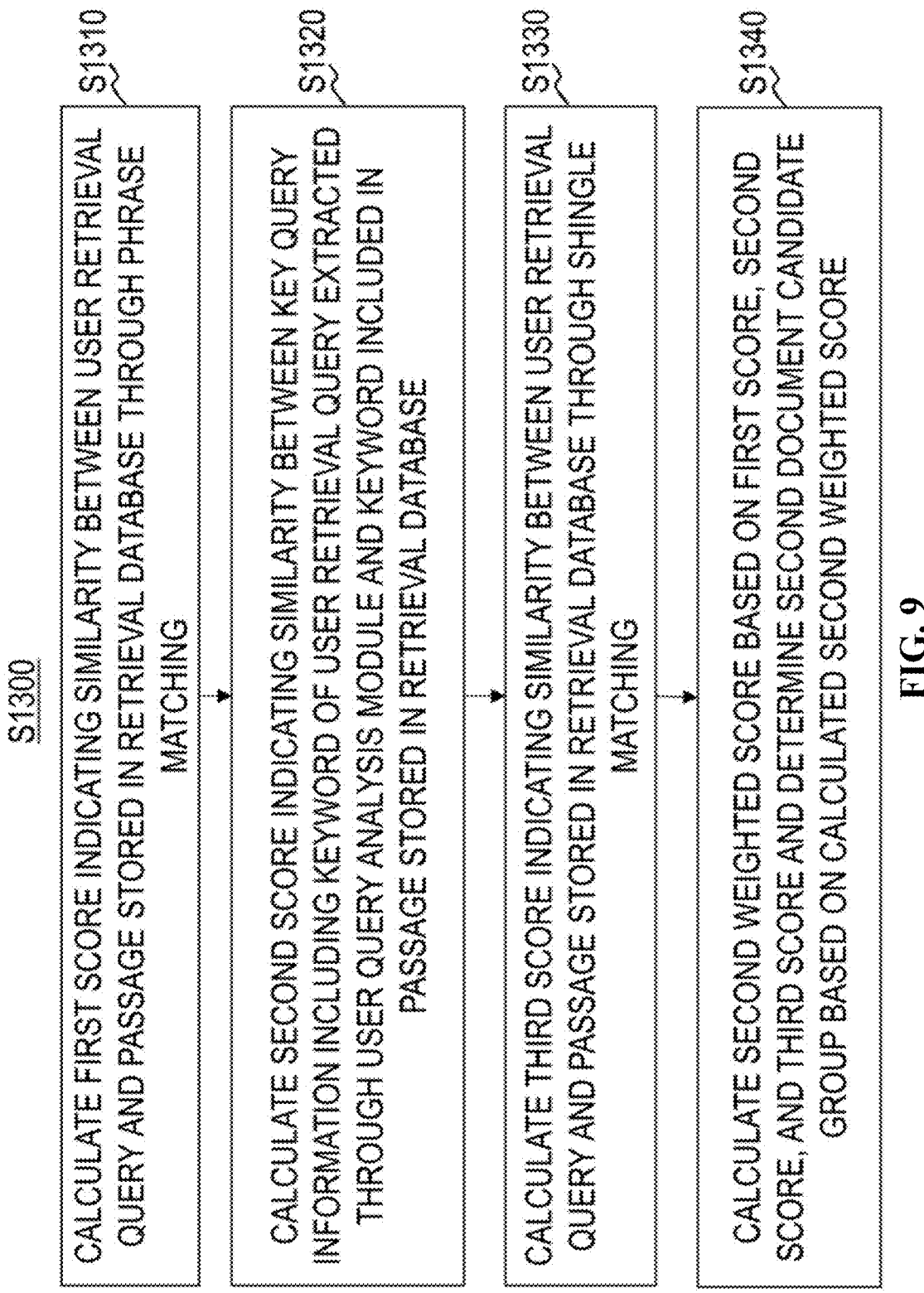

S1300

CALCULATE FIRST SCORE INDICATING SIMILARITY BETWEEN USER RETRIEVAL QUERY AND PASSAGE STORED IN RETRIEVAL DATABASE THROUGH PHRASE MATCHING — S1310

CALCULATE SECOND SCORE INDICATING SIMILARITY BETWEEN KEY QUERY INFORMATION INCLUDING KEYWORD OF USER RETRIEVAL QUERY EXTRACTED THROUGH USER QUERY ANALYSIS MODULE AND KEYWORD INCLUDED IN PASSAGE STORED IN RETRIEVAL DATABASE — S1320

CALCULATE THIRD SCORE INDICATING SIMILARITY BETWEEN USER RETRIEVAL QUERY AND PASSAGE STORED IN RETRIEVAL DATABASE THROUGH SHINGLE MATCHING — S1330

CALCULATE SECOND WEIGHTED SCORE BASED ON FIRST SCORE, SECOND SCORE, AND THIRD SCORE AND DETERMINE SECOND DOCUMENT CANDIDATE GROUP BASED ON CALCULATED SECOND WEIGHTED SCORE — S1340

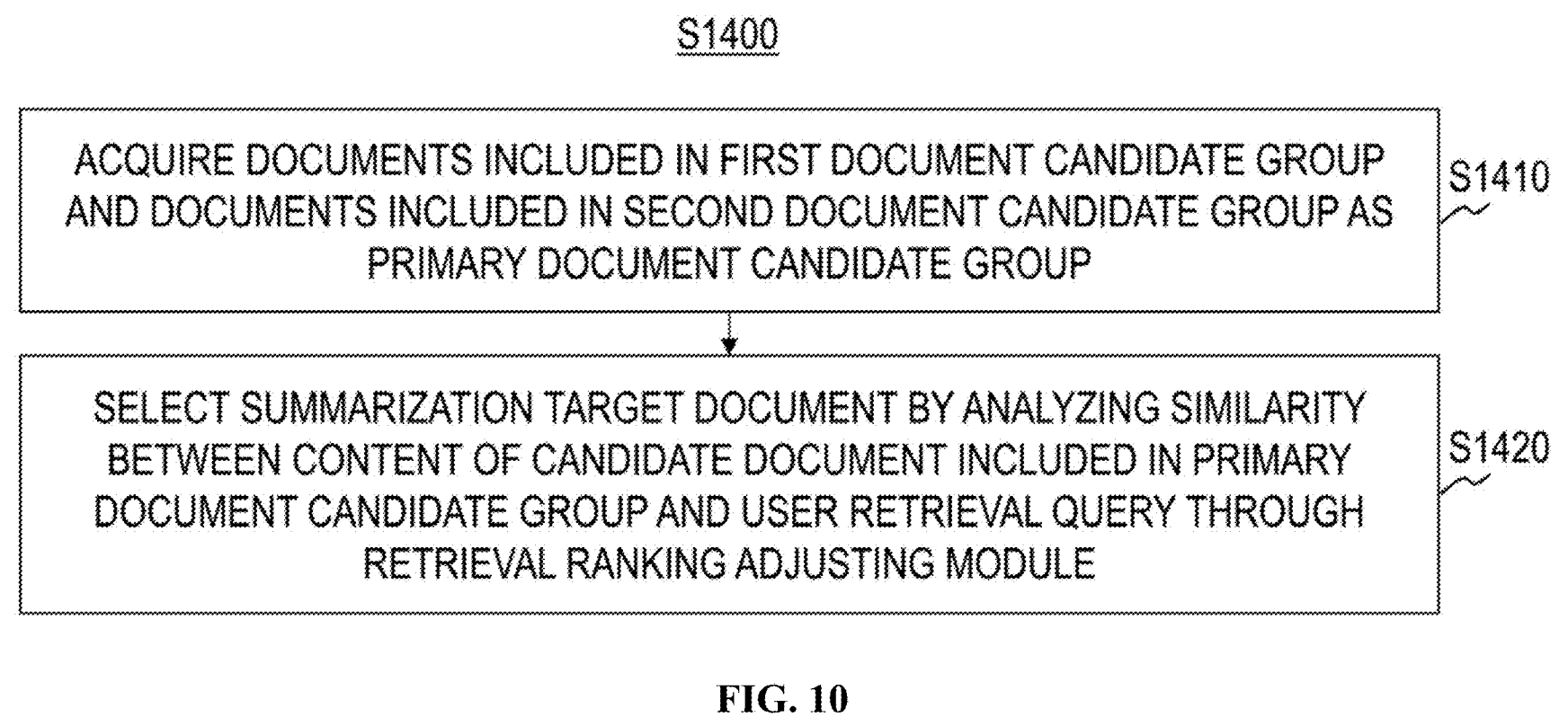

ACQUIRE DOCUMENTS INCLUDED IN FIRST DOCUMENT CANDIDATE GROUP AND DOCUMENTS INCLUDED IN SECOND DOCUMENT CANDIDATE GROUP AS PRIMARY DOCUMENT CANDIDATE GROUP

S1420

SELECT SUMMARIZATION TARGET DOCUMENT BY ANALYZING SIMILARITY BETWEEN CONTENT OF CANDIDATE DOCUMENT INCLUDED IN PRIMARY DOCUMENT CANDIDATE GROUP AND USER RETRIEVAL QUERY THROUGH RETRIEVAL RANKING ADJUSTING MODULE

FIG. 10

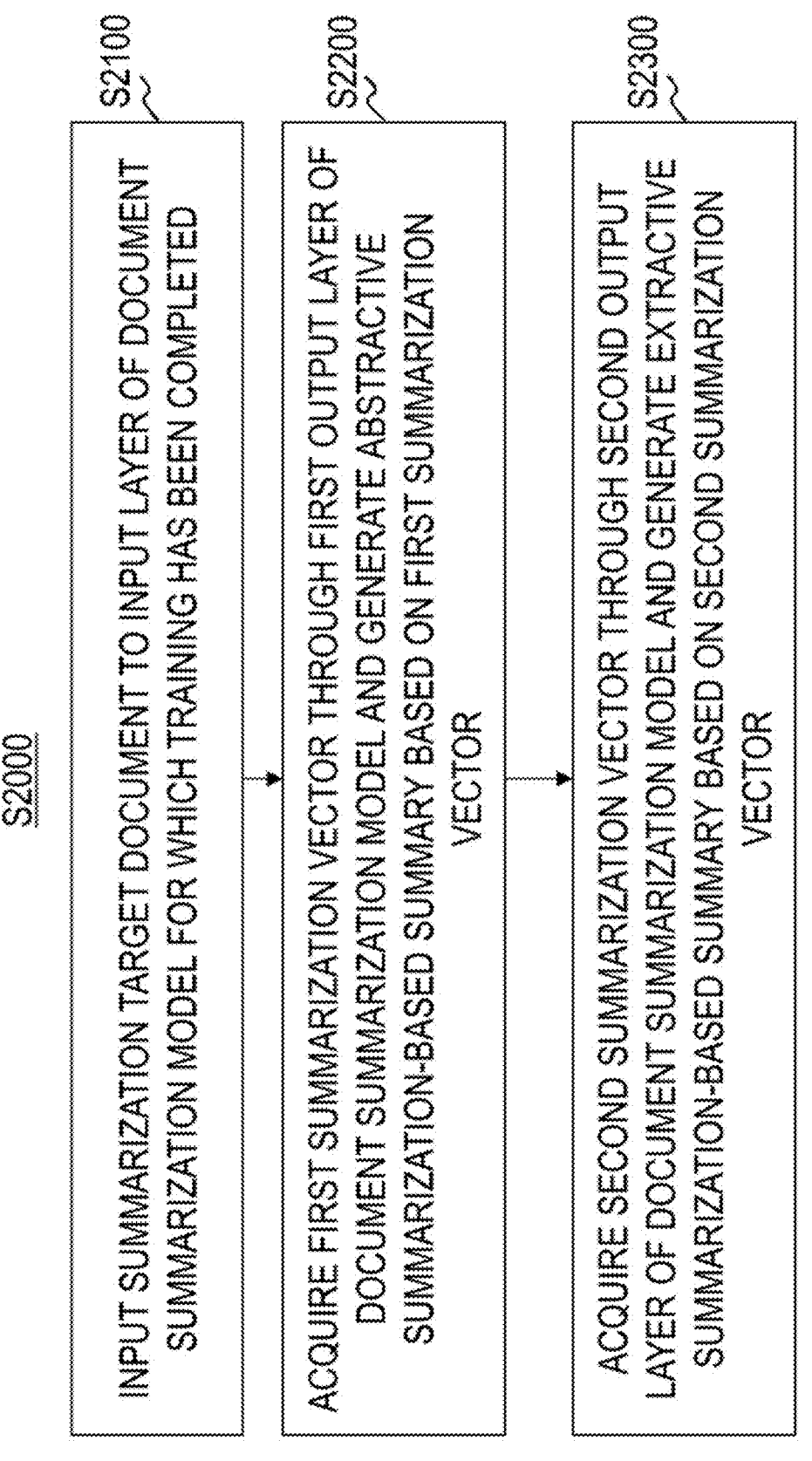

S2000

S2100

INPUT SUMMARIZATION TARGET DOCUMENT TO INPUT LAYER OF DOCUMENT SUMMARIZATION MODEL FOR WHICH TRAINING HAS BEEN COMPLETED

S2200

ACQUIRE FIRST SUMMARIZATION VECTOR THROUGH FIRST OUTPUT LAYER OF DOCUMENT SUMMARIZATION MODEL AND GENERATE ABSTRACTIVE SUMMARIZATION-BASED SUMMARY BASED ON FIRST SUMMARIZATION VECTOR

S2300

ACQUIRE SECOND SUMMARIZATION VECTOR THROUGH SECOND OUTPUT LAYER OF DOCUMENT SUMMARIZATION MODEL AND GENERATE EXTRACTIVE SUMMARIZATION-BASED SUMMARY BASED ON SECOND SUMMARIZATION VECTOR

FIG. 11

METHOD AND APPARATUS FOR SUMMARIZING DOCUMENT BASED ON DOCUMENT RETRIEVAL

CROSS-REFERENCE TO RELATED APPLICATION

This application is a Continuation application of U.S. application Ser. No. 18/071,105, filed on Nov. 29, 2022, which claims priority to and the benefit of Korean Patent Application No. 10-2022-0155113, filed on Nov. 18, 2022, the disclosure of which is incorporated herein by reference in its entirety.

BACKGROUND OF THE INVENTION

1. Field of the Invention

The present disclosure relates to a method of retrieving a document to a user's request and an apparatus for retrieving a document according. Furthermore, the present disclosure relates to a method of summarizing a retrieved document and an apparatus for summarizing a document.

2. Description of the Related Art

There has been a problem that it takes a lot of time for a user to retrieve related materials to prepare a report and to directly check the materials to find the desired content from the result list items. In order to solve this problem, research on a technology for retrieving related documents according to a user's request and providing a summary of the desired content is attracting attention.

As a method of retrieving a document, the retrieval of a text matching method has been traditionally used. However, the text matching-based retrieval has limitations in that performance is too dependent on whether the same or similar words are present between the user's inquiry and the document to be retrieved and that the design and management from natural language processing (NLP) experts and retrieval experts are continuously required. Deep learning-based retrieval is being studied to supplement the retrieval by text matching method. However, there are various limitations that contexts sufficient for the user's inquiry need to be present, high-specification machine is required, and advancement and reinforcement training of model should be continuously carried out in order for the deep learning-based retrieval to work.

Meanwhile, the method of providing a summary of a document is largely composed of an extractive summarization and an abstractive summarization. The extractive summarization is a method of extracting and providing phrases in a document and has an advantage of being relatively easy and fast to summarize, but has a disadvantage in that the summary may not be extracted as a relatively natural sentence. On the other hand, the abstractive summarization has an advantage of providing a relatively natural summary by generating and providing a new sentence based on the content in the document. However, there has been a limitation that the conventional technology of summarizing the document is biased toward generating an extractive summarization-based summary.

Therefore, there is a need for a new method of retrieving a document for retrieving a document by combining the advantages of the text matching-based retrieval and the deep learning-based retrieval, the development of a document apparatus, a new method of summarizing a document for providing an abstractive summarization-based summary, and the development for an apparatus for summarizing a document.

SUMMARY OF THE INVENTION

The present disclosure is directed to providing a method of retrieving a document for retrieving a document by combining advantages of a text matching-based retrieval and a deep learning-based retrieval, and an apparatus for retrieving a document.

The present disclosure is directed to providing a method of summarizing a document and an apparatus for summarizing a document for retrieving related documents based on a user's inquiry and generating a summary of a content desired by the user in the retrieved document.

The present disclosure is directed to providing a method of summarizing a document and an apparatus for summarizing a document for training a document summarization model for generating an abstractive summarization-based summary and an extractive summarization-based summary.

The objects of the present disclosure are not limited to the above-described objects, and other objects that are not mentioned will be able to be clearly understood by those skilled in the art to which the present disclosure pertains from the specification and the accompanying drawings.

According to an embodiment of the present application, there may be provided a method for summarizing a document, comprising: acquiring a user inquiry vector from a user retrieval query; extracting a key sentence of a passage of a document stored in a retrieval database from the passage of the document; calculating a first similarity score between the user inquiry vector and a sentence vector corresponding to the key sentence extracted from the passage of the document by inputting the user inquiry vector and the sentence vector to a bi-encoder of a bi-encoder type deep learning model; calculating a second similarity score between the user inquiry vector and a sentence vector corresponding to a sentence summarizing the passage of the document stored in the retrieval database; generating a question from the passage of the document stored in the retrieval database through a generation model; calculating a third similarity score between a question vector corresponding to the question generated from the passage stored in the retrieval database and the user inquiry vector; calculating a first weighted score based on the first similarity score, the second similarity score, and the third similarity score; determining a first document candidate group including first documents based on the calculated first weighted score; calculating a first score indicating similarity between the user retrieval query and a passage stored in the retrieval database through a phrase matching; calculating a second score indicating similarity between key query information including a keyword of the user retrieval query extracted through a user query analysis module and a keyword included in the passage stored in the retrieval database; calculating a third score indicating similarity between the user retrieval query and the passage stored in the retrieval database through a shingle matching; calculating a second weighted score based on the first score, the second score, and the third score; determining a second document candidate group including second documents based on the calculated second weighted score; acquiring a primary document candidate group including the first documents of the first document candidate group and the second documents of the second document candidate group; calculating a fourth score indicating similarity between a passage of a document in the primary document candidate group and the user retrieval query by inputting the passage of the document in the primary document candidate group and the user retrieval query to a cross-encoder of cross-encoder type deep learning model; calculating a fifth score indicating similarity between the key query information including the keyword of the user retrieval query and a keyword included in the passage of the document in the primary document candidate group using a BM25F score calculation algorithm; determining a summarization target document based on one or more of the fourth score and the firth score; and acquiring one or more of an abstractive summarization-based first summary and an extractive summarization-based second summary from the determined summarization target document through a trained document summarization model.

According to an embodiment of the present application, there may be provided an apparatus for summarizing a document, comprising: a memory storing instructions; and a hardware processor configured to execute the instructions to: acquire a user inquiry vector from a user retrieval query, extract a key sentence of a passage of a document stored in a retrieval database from the passage of the document, calculate a first similarity score between the user inquiry vector and a sentence vector corresponding to the key sentence extracted from the passage of the document by inputting the user inquiry vector and the sentence vector to a bi-encoder of a bi-encoder type deep learning model, calculate a second similarity score between the user inquiry vector and a sentence vector corresponding to a sentence summarizing the passage of the document stored in the retrieval database, generate a question from the passage of the document stored in the retrieval database through a generation model, calculate a third similarity score between a question vector corresponding to the question generated from the passage stored in the retrieval database and the user inquiry vector, calculate a first weighted score based on the first similarity score, the second similarity score, and the third similarity score, determine a first document candidate group including first documents based on the calculated first weighted score, calculate a first score indicating similarity between the user retrieval query and a passage stored in the retrieval database through a phrase matching, calculate a second score indicating similarity between key query information including a keyword of the user retrieval query extracted through a user query analysis module and a keyword included in the passage stored in the retrieval database, calculate a third score indicating similarity between the user retrieval query and the passage stored in the retrieval database through a shingle matching, calculate a second weighted score based on the first score, the second score, and the third score, determine a second document candidate group including second documents based on the calculated second weighted score, acquire a primary document candidate group including the first documents of the first document candidate group and the second documents of the second document candidate group, calculate a fourth score indicating similarity between a passage of a document in the primary document candidate group and the user retrieval query by inputting the passage of the document in the primary document candidate group and the user retrieval query to a cross-encoder of cross-encoder type deep learning model, calculate a fifth score indicating similarity between the key query information including the keyword of the user retrieval query and a keyword included in the passage of the document in the primary document candidate group using a score calculation algorithm, determine a summarization target document based on one or more of the fourth score and the firth score, and acquire one or more of an abstractive summarization-based first summary and an extractive summarization-based second summary from the determined summarization target document through a trained document summarization model.

The configuration of the present disclosure is not limited to the above-described configurations, and other configurations that are not mentioned will be clearly understood from those skilled in the art to which the present disclosure pertains from this specification and the accompanying drawings.

BRIEF DESCRIPTION OF THE DRAWINGS

FIG. 7 is a flowchart specifically showing an operation of extracting a summarization target document according to an embodiment of the present application;

FIG. 8 is a flowchart specifically showing an operation of acquiring a first document candidate group according to an embodiment of the present application;

FIG. 9 is a flowchart specifically showing an operation of acquiring a second document candidate group according to an embodiment of the present application;

FIG. 10 is a flowchart specifically showing an operation of determining the summarization target document according to an embodiment of the present application;

FIG. 11 is a flowchart specifically showing an operation of acquiring an abstractive summarization-based summary from the extracted summarization target document according to an embodiment of the present application;

DETAILED DESCRIPTION OF THE PREFERRED EMBODIMENTS

Figure 1:
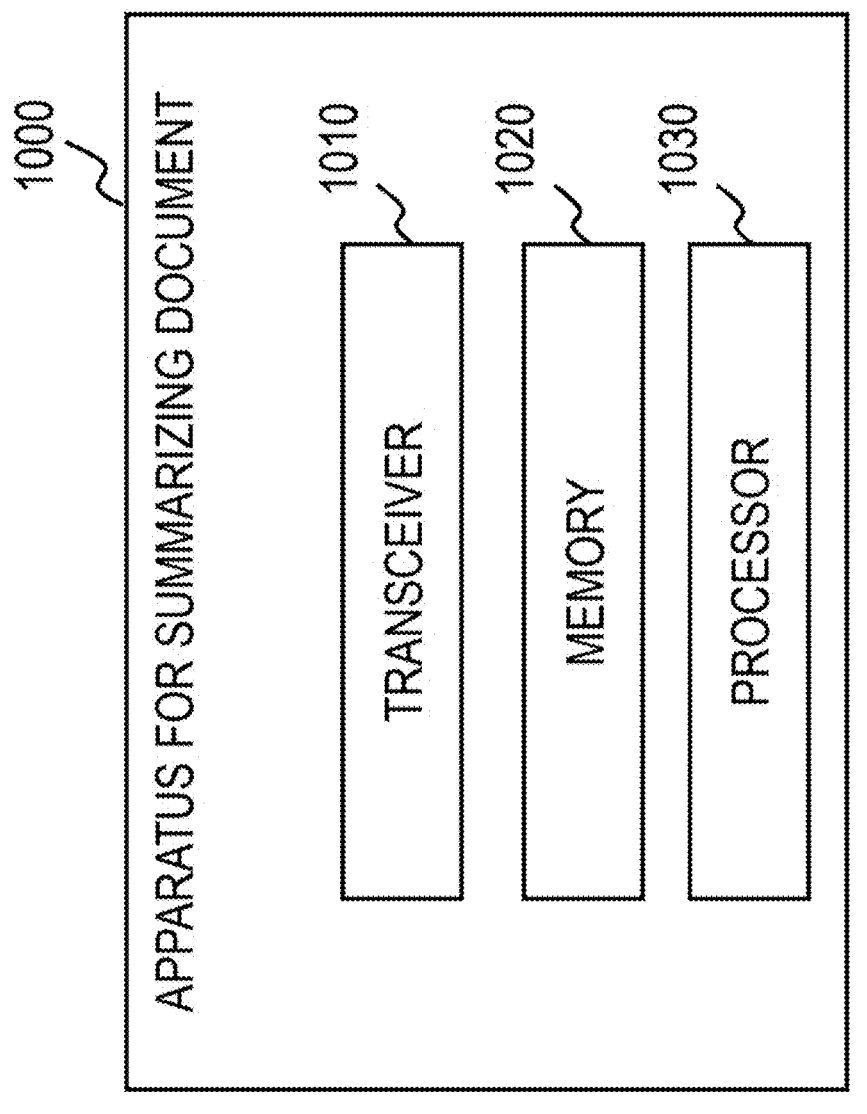
FIG. 1 is a schematic diagram showing an apparatus for summarizing a document according to an embodiment of the present application.

The above-mentioned objects, features, and advantages of the present application will become more apparent from the following detailed description in conjunction with the accompanying drawings. However, since the present application may have various changes and various embodiments, specific embodiments will be exemplified in the drawings and described in detail below.

Throughout the specification, the same reference numerals refer to the same components in principle. In addition, components having the same function within the scope of the same spirit shown in the drawing of each embodiment will be described using the same reference numerals, and overlapping descriptions thereof will be omitted.

When it is determined that a detailed description of a known function or configuration related to the present application may unnecessarily obscure the gist of the present application, the detailed description thereof will be omitted. In addition, numbers (e.g., first, or second) used in the process of describing the specification are merely identification symbols for distinguishing one component from another.

In addition, the suffixes "module" and "unit" for the components used in the following embodiments are given or used interchangeably in consideration of only the ease of preparing the specification and do not have distinct meanings or roles by themselves.

In the following embodiments, the singular expression includes the plural expression unless the context clearly dictates otherwise.

In the following embodiments, terms such as "comprises" or "has" mean that the features or components described in the specification are present and do not preclude the possibility of the addition of one or more other features or components.

In the drawings, the sizes of the components may be exaggerated or reduced for convenience of description. For example, the size and thickness of each component shown in the drawings are arbitrarily indicated for convenience of description, and the present disclosure is not necessarily limited to those shown.

In a case in which certain embodiments are otherwise implementable, the order of a specific process may also be performed differently from the order to be described. For example, two processes consecutively described may also be performed substantially simultaneously and may be performed in an order opposite to the order to be described.

In the following embodiments, when components are described as being connected, it includes not only a case in which the components are directly connected, but also a case in which the components are connected indirectly with other components interposed therebetween.

For example, in the specification, when components and the like are described as being electrically connected, it includes not only a case in which the components are directly electrically connected, but also a case in which the components are indirectly electrically connected with other components or the like interposed therebetween.

A method of retrieving a document according to an embodiment of the present application may include: acquiring a user retrieval query; calculating a user inquiry vector in a unit of sentence from the user retrieval query and acquiring a first document candidate group based on similarity between the calculated user inquiry vector an embedding vector of a document stored in a retrieval database; acquiring a second document candidate group based on similarity between a text included in the user retrieval query and a text of the document stored in the retrieval database; and determining a summarization target document based on the first document candidate group and the second document candidate group.

According to an embodiment of the present application, the acquiring of a first document candidate group may further include: calculating a first similarity score between the user inquiry vector and a sentence vector extracted from a passage of the document stored in the retrieval database; calculating a second similarity score between the user inquiry vector and a sentence vector summarizing the passage of the document stored in the retrieval database; calculating a third similarity score between a question vector generated from the passage stored in the retrieval database through a generation model and the user inquiry vector; and calculating a first weighted score based on the first similarity score, the second similarity score, and the third similarity score and determining the first document candidate group based on the calculated first weighted score.

According to an embodiment of the present application, the acquiring of a second document candidate group may further include: calculating a first score indicating similarity between the user retrieval query and the passage stored in the retrieval database through a phrase matching; calculating a second score indicating similarity between key query information including a keyword of the user retrieval query extracted through a user query analysis module and a keyword included in the passage stored in the retrieval database; calculating a third score indicating similarity between the user retrieval query and the passage stored in the retrieval database through a shingle matching; and calculating a second weighted score based on the first score, the second score, and the third score and determining the second document candidate group based on the calculated second weighted score.

According to an embodiment of the present application, the determining of the summarization target document may further include: acquiring documents included in the first document candidate group and documents included in the second document candidate group as a primary document candidate group; and selecting the summarization target document from the primary document candidate group by analyzing similarity between a content of a candidate document included in the primary document candidate group and the user retrieval query through a retrieval ranking adjusting module.

According to an embodiment of the present application, the retrieval ranking adjusting module may be configured to calculate a fourth similarity score indicating semantic similarity between the candidate document and the user retrieval query from a candidate document included in the primary document candidate group and the user retrieval query using a trained cross-encoder type deep learning model.

According to an embodiment of the present application, the retrieval ranking adjusting module may be configured to calculate a fifth similarity score between the key query information extracted from the user retrieval query and a keyword included in the candidate document included in the primary document candidate group using a BM25F score calculation algorithm.

According to an embodiment of the present application, the selecting the summarization target document may further include: calculating a weighted sum similarity score of each candidate document included in the primary document candidate group based on the fourth similarity score and the fifth similarity score; adjusting a ranking of candidate documents included in the primary document candidate group based on the weighted sum similarity score; and determining the summarization target document based on the adjusted ranking.

According to an embodiment of the present application, a computer-readable recording medium in which a program for executing the method of retrieving a document is recorded may be provided to the computer.

An apparatus for retrieving a document according to an embodiment of the present application may include: a transceiver configured to receive a user retrieval query; and a processor configured to retrieve a summarization target document from a plurality of documents of a retrieval database from the user retrieval query, wherein the processor may be configured to acquire the user retrieval query, calculate a user inquiry vector in a unit of sentence from the user retrieval query, acquire a first document candidate group based on similarity between the calculated user inquiry vector and an embedding vector of a document stored in the retrieval database, acquire a second document candidate group based on similarity between a text included in the user retrieval query and a text of the document stored in the retrieval database, and determine the summarization target document based on the first document candidate group and the second document candidate group.

The method of summary a document according to an embodiment of the present application may include: extracting a summarization target document based on a user retrieval query; acquiring a document summarization model for which training has been completed; and inputting the summarization target document to the document summarization model for which training has been completed, acquiring a first summarization vector through a first output layer of the document summarization model for which training has been completed, and acquiring an abstractive summarization-based summary based on the first summarization vector, wherein the document summarization model may be trained based on a training data set composed of an original document and abstractive summarization correct answer information and trained to acquire the original document through an input layer and output output data that is approximate to the abstractive summarization correct answer information based on a difference between the output data output through the first output layer of the document summarization model and the abstractive summarization correct answer information.

According to an embodiment of the present application, the acquiring of the abstractive summarization-based summary may further include: acquiring a second summarization vector through a second output layer of the document summarization model for which training has been completed and acquiring an extractive summarization-based summary based on the second summarization vector, wherein the document summarization model may be trained to output the extractive summarization vector through the second output layer of the document summarization model using the extractive summarization vector determined by calculating similarity between the abstractive summarization correct answer information and each sentence included in the original document.

According to an embodiment of the present application, the extracting of the summarization target document may further include: acquiring the user retrieval query; calculating a vector in a unit of sentence from the user retrieval query and acquiring a first document candidate group based on similarity between the calculated vector and an embedding vector of a document stored in a retrieval database; extracting key query information from the user retrieval query through a user query analysis module and acquiring a second document candidate group based on similarity between the extracted key query information and keyword information of the document stored in the retrieval database;

and determining the summarization target document based on the first document candidate group and the second document candidate group.

According to an embodiment of the present application, the determining of the summarization target document may further include: acquiring documents included in the first document candidate group and documents included in the second document candidate group as a primary document candidate group; and selecting the summarization target document from the primary document candidate group by analyzing similarity between a content of a candidate document included in the primary document candidate group and the user retrieval query through a retrieval ranking adjusting module.

According to an embodiment of the present application, the retrieval ranking adjusting module may be configured to calculate a similarity score related to semantic similarity between a candidate document and the user retrieval query after receiving the candidate document included in the primary document candidate group and the user retrieval query, adjust a ranking of candidate documents included in the primary document candidate group based on the calculated similarity score, and select the summarization target document from the primary document candidate group based on the adjusted ranking.

According to an embodiment of the present application, a computer-readable recording medium in which a program for executing the method of summarizing a document is recorded may be provided to the computer.

An apparatus for summarizing a document according to an embodiment of the present application may include a processor configured to extract a summarization target document based on a user retrieval query, acquire a document summarization model for which training has been completed, input the summarization target document to the document summarization model for which training has been completed, acquire a first summarization vector through a first output layer of the document summarization model for which training has been completed, and acquire an abstractive summarization-based summary based on the first summarization vector, wherein the document summarization model may be trained based on a training data set composed of an original document and abstractive summarization correct answer information and trained to acquire the original document and output output data that is approximate to the abstractive summarization correct answer information based on a difference between the output data output through a first output layer of the document summarization model and the abstractive summarization correct answer information.

Hereinafter, the method of retrieving a document, the method of summarizing a document, and the apparatus for summarizing a document (or the apparatus for retrieving a document, hereinafter referred to as the "apparatus for summarizing a document") according to an embodiment of the present application will be described with reference to FIGS. 1 to 13. In the specification, retrieving a "document" and summarizing a "document" Will be described. However, this is only for convenience of description, and the meaning of retrieving a document and summarizing a document described in the specification should be construed to include retrieving and summarizing at least a part of a document, including a passage included in the document.

FIG. 1 is a schematic diagram showing an apparatus 1000 for summarizing a document according to an embodiment of the present application.

The apparatus 1000 for summarizing a document according to an embodiment of the present application may include a transceiver 1010, a memory 1020, and a processor 1030.

The transceiver 1010 of the apparatus 1000 for summarizing a document may perform communication with any external device (or an external server) including a database in which an original data source is stored or a user device. For example, the apparatus 1000 for summarizing a document may receive a user retrieval query input through the user device through the transceiver 1010. For example, the apparatus 1000 for summarizing a document may receive original data from the database in which the original data source is stored and build a retrieval database based on the original data. For example, the apparatus 1000 for summarizing a document may transmit a generated summary to any external device including the user device.

The apparatus 1000 for summarizing a document may access a network through the transceiver 1010 and transmit or receive various types of data. The transceiver 1010 may largely include a wired type and a wireless type. Since the wired type and the wireless type have their respective advantages and disadvantages, the wired type and the wireless type may be simultaneously provided in the apparatus 1000 for summarizing a document in some cases. Here, as the wireless type, a wireless local area network (WLAN)-based communication method such as Wi-Fi may be mainly used. Alternatively, as the wireless type, cellular communication, for example, long term evolution (LTE), fifth generation (5G)-based communication method may be used. However, a wireless communication protocol is not limited to the above-described example, and any suitable wireless type communication method may also be used. As the wired type, local area network (LAN) or universal serial bus (USB) communication is a representative example, and other methods are also possible.

The memory 1020 of the apparatus 1000 for summarizing a document may store various types of information. Various data may be temporarily or semi-permanently stored in the memory 1020. Examples of the memory 1020 may include a hard disk drive (HDD), a solid state drive (SSD), a flash memory, a read-only memory (ROM), a random access memory (RAM), and the like. The memory 1020 may be provided in the form embedded in the apparatus 1000 for summarizing a document or in a detachable form. Various data necessary for an operation of the apparatus 1000 for summarizing a document including an operating program (operating system (OS)) for driving the apparatus 1000 for summarizing a document or a program for operating each component of the apparatus 1000 for summarizing a document may be stored in the memory 1020.

The processor 1030 may control the overall operation of the apparatus 1000 for summarizing a document. For example, the processor 1030 may control the overall operation of the apparatus 1000 for summarizing a document including an operation of extracting or retrieving a summarization target document based on a user retrieval query to be described below, an operation of acquiring or generating a summary from the extracted summarization target document, or the like. Specifically, the processor 1030 may load and execute a program for the overall operation of the apparatus 1000 for summarizing a document from the memory 1020. The processor 1030 may be implemented as an application processor (AP), a central processing unit (CPU), a microcontroller unit (MCU), or devices similar thereto according to hardware, software, or a combination thereof. In this case, hardware may be provided in the form of an electronic circuit functioning to perform a control function by processing an electrical signal, and software may be provided in the form of a program or code for driving a hardware circuit.

The apparatus 1000 for summarizing a document according to an embodiment of the present application may retrieve a retrieval database based on the user retrieval query and extract a document candidate group including one or more documents. Furthermore, the apparatus 1000 for summarizing a document may determine a summarization target document from the extracted document candidate group through similarity analysis between a content of a document included in the extracted document candidate group and the user retrieval query. This will be described in more detail with reference to FIG. 2 and FIG. 6 to FIG. 10.

The apparatus 1000 for summarizing a document according to an embodiment of the present application may perform an operation of summarizing the summarization target document. As an example, the apparatus 1000 for summarizing a document may perform an operation of generating a summary from the summarization target document using a document summarization model for which training has been completed. Meanwhile, the document summarization model for which training has been completed according to an embodiment of the present application is characterized as being configured to simultaneously generate an abstractive summary and an extractive summary based on the summarization target document. This will be described in more detail with reference to FIGS. 5 and 11 to 13.

Hereinafter, the method for retrieving a document, the method for summarizing a document, and the apparatus for summarizing a document according to an embodiment of the present application will be described in more detail with reference to FIGS. 2 and 5.

Figure 2:
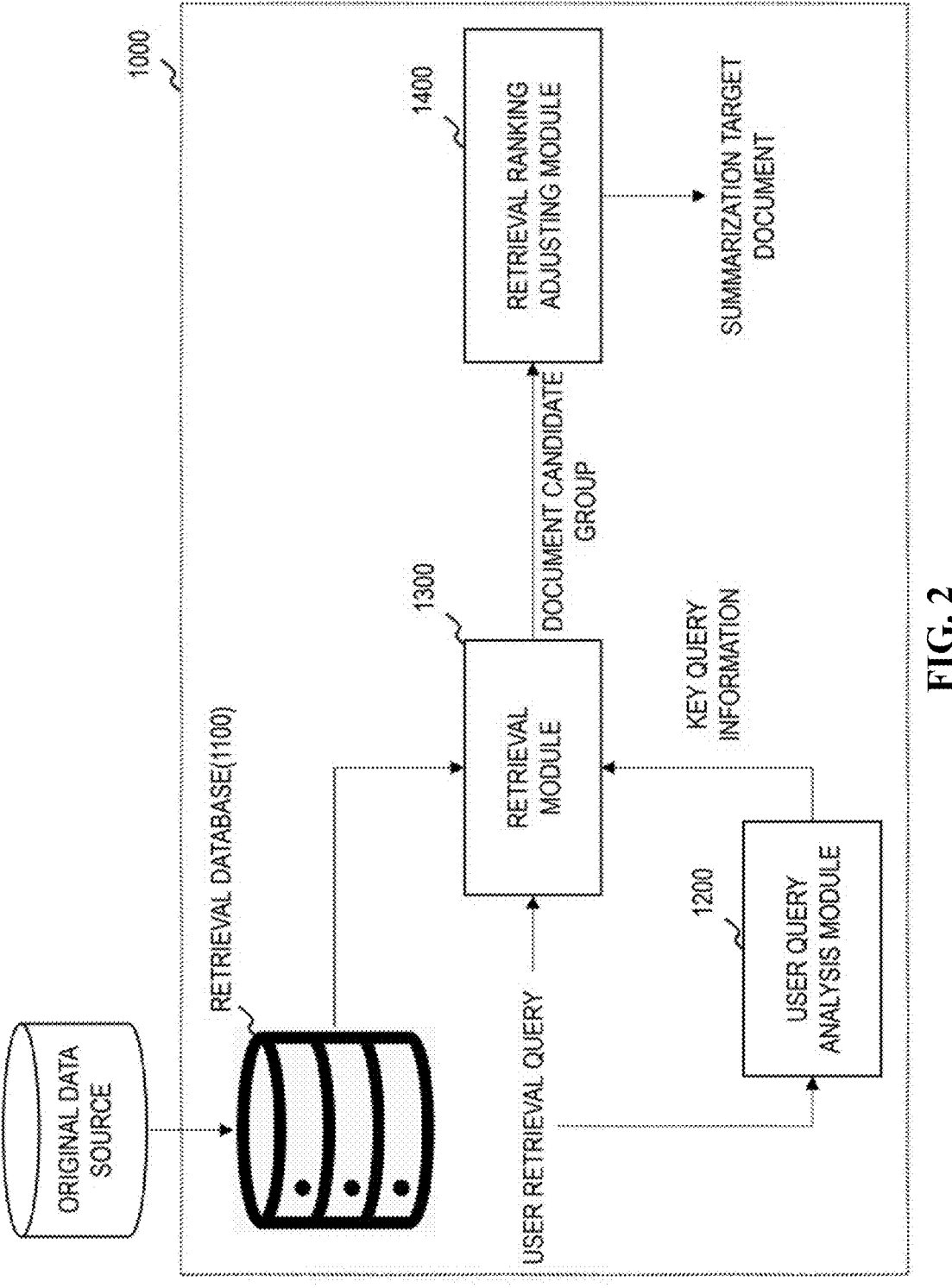
FIG. 2 is a view showing an operation of retrieving a summarization target document from a user retrieval query of an apparatus for summarizing a document according to an embodiment of the present application.

FIG. 2 is a view showing an operation of retrieving a summarization target document from a user retrieval query of the apparatus 1000 for summarizing a document according to an embodiment of the present application.

The apparatus 1000 for summarizing a document according to an embodiment of the present application may perform an operation of building a retrieval database 1100 using an original data source. Specifically, the apparatus 1000 for summarizing a document may acquire the original data source, index each document itself included in the original data source, and/or vectorize a content included in each document. For example, the apparatus 1000 for summarizing a document may build the retrieval database using the original data source through an extraction, transform, and load (ETL) technique.

Specifically, the apparatus 1000 for summarizing a document may be implemented to segment each document included in the original data source in a unit of a passage of a single subject. For example, the apparatus 1000 for summarizing a document may segment each document in a unit of passage by recognizing a section title and a paragraph of each document through a document understanding model capable of structuring and extracting a document. For example, the apparatus 1000 for summarizing a document may segment each document in a unit of passage through a paragraph extraction algorithm or a sentence extraction algorithm.

Further, the apparatus 1000 for summarizing a document may perform text encoding in a unit of segmented passage. Specifically, the apparatus 1000 for summarizing a document may convert the text included in the passage into a dense vector in order to acquire semantic information of the text. For example, the apparatus 1000 for summarizing a document may encode the text in a unit of passage through a model obtained by tuning a pre-trained language model with training data of a pre-trained language model (e.g., BERT) or a specific domain (e.g., a legal domain or a financial domain) and convert a passage vector (or a sentence vector) having a dense vector form. In addition, the apparatus 1000 for summarizing a document may store the converted vector in the retrieval database 1100. The vector stored in the retrieval database 1100 may be used for the retrieval of a retrieval module 1300 to be described below.

Further, the apparatus 1000 for summarizing a document may analyze the text in a unit of segmented passage. Specifically, the apparatus 1000 for summarizing a document may acquire type information of the passage, acquire domain information of the passage, or extract a key word (e.g., a keyword) of the passage by analyzing the text included in the segmented passage. Further, the apparatus 1000 for summarizing a document may extract a key sentence of the passage, generate a question in a unit of a sentence from the passage through a generation model, or generate a summary summarizing the passage in a unit of sentence by analyzing the text included in the segmented passage. In addition, the apparatus 1000 for summarizing a document may store text analysis results (e.g., type information of the passage, domain information of the passage, a key word of the passage, a key sentence of the passage, a question in a unit of sentence, and/or a summary in a unit of sentence) in the retrieval database 1100. At this time, the text analysis results stored in the retrieval database 1100 may be used for the retrieval of the retrieval module 1300 to be described below. For example, the key word of the passage may be utilized for the text matching-based retrieval through comparison with key query information extracted from the user retrieval query. For example, the key sentence of the passage, the question generated from the passage in a unit of sentence, and/or a summary in a unit of sentence may be utilized for retrieval through comparison with the user inquiry in a unit of sentence, and the retrieval may be performed in a sentence-to-sentence manner, thereby enhancing retrieval performance. Meanwhile, FIG. 2 shows that the embedding vector of each document, the key word of the passage, the key sentence of the passage, and the like are stored in the retrieval database 1100. However, the present application is not limited thereto, and the retrieval module 1300 may be implemented to calculate the embedding vector, the key word of the passage, the key sentence of the passages, and the like described above from the passage of each document stored in the retrieval database 1100.

Further, the apparatus 1000 for summarizing a document may perform an operation of classifying and storing each document included in the original data source into an original, an extracted passage, an embedding vector (e.g., a passage vector or a sentence vector), and/or meta information, and indexing the original, the extracted passage, the embedding vector, and/or the meta information into a retrieval engine.

The apparatus 1000 for summarizing a document according to an embodiment of the present application may acquire the user retrieval query (or may be referred to as a "user inquiry") from the user device. At this time, the apparatus 1000 for summarizing a document may perform an operation of analyzing the form of the user inquiry through the user query analysis module 1200. For example, the user query analysis module 1200 may extract information such as a length of the user inquiry, the number of tokens, and/or a morpheme and determine whether the user inquiry is an inquiry form (e.g., a sentence form (e.g., a question)), a phrase form (e.g., a table of contents of a report), and/or a paragraph form based on the extracted information.

Further, the apparatus 1000 for summarizing a document may classify the domain of the user retrieval query or extract key query information indicating a key feature of the user retrieval query from the user retrieval query by analyzing the user retrieval query. Specifically, the apparatus 1000 for summarizing a document may extract key query information related to the domain, intention, and/or key word (keyword) of the user retrieval query by analyzing the features of the natural language of the user retrieval query through the user query analysis module 1200. Further, the apparatus 1000 for summarizing a document may transmit the user retrieval query, the domain of the user retrieval query, and/or the extracted key query information to the retrieval module 1300. Further, the user query analysis module 1200 of the apparatus 1000 for summarizing a document according to an embodiment of the present application may convert the user retrieval query into a dense vector and transmit the converted dense vector to the retrieval module 1300.

Meanwhile, there may be a case in which the user retrieval query is ambiguous or a case in which the user retrieval query is short. In such cases, the apparatus 1000 for summarizing a document according to an embodiment of the present application may perform an operation of expanding the user retrieval query. Specifically, when the user retrieval query is not recognized or when it is determined that the user retrieval query is ambiguous, the user query analysis module 1200 of the apparatus 1000 for summarizing a document may generate a question to be provided to the user to specify the user retrieval query based on the user retrieval query using a generation model. Further, the apparatus 1000 for summarizing a document may be configured to transmit the generated question to a user terminal, acquire the user retrieval query received from the user terminal in response to the generated question, and retrieve documents of the retrieval database 1100 based on the acquired user retrieval query.

The apparatus 1000 for summarizing a document according to an embodiment of the present application may retrieve the retrieval database 1100 based on the user retrieval query and acquire a document candidate group.

For example, the retrieval module 1300 of the apparatus 1000 for summarizing a document may retrieve a document having relevance with the user retrieval query from the retrieval database 1100 through the text matching-based retrieval. For example, the retrieval module 1300 of the apparatus 1000 for summarizing a document may retrieve the document having relevancy with the user retrieval query through the text matching-based retrieval including a keyword-based retrieval, a phrase matching retrieval, and/or a Shingle matching retrieval. For example, the retrieval module 1300 may extract documents corresponding to the index (or keyword) related to the key query information as the document candidate group based on the key query information extracted through the user query analysis module 1200 and the index (or keyword) of the document of the retrieval database 1100. For example, the retrieval module 1300 may calculate a score for relevance between the key query information and the index (or keyword) of the document of the retrieval database 1100 and acquire documents corresponding to a predetermined ranking as the document candidate group. A description in which a document candidate group is acquired through the text matching-based retrieval will be made in more detail with reference to FIG. 3.

As another example, the retrieval module 1300 of the apparatus 1000 for summarizing a document may retrieve a document having relevance with the user retrieval query from the retrieval database 1100 through a vector retrieval using a deep learning model. Specifically, the retrieval module 1300 may calculate similarity between a vector extracted from the user retrieval query and an embedding vector of each sentence included in the document stored in the retrieval database 1100 through a deep learning model (e.g., a bi-encoder type or a cross-encoder type deep learning model) and extract a document candidate group based on the calculated similarity. For example, the retrieval module 1300 may calculate a similarity score between vector information corresponding to the user retrieval query and an embedding vector of the document stored in the retrieval database and acquire documents having the embedding vector corresponding to a predetermined ranking as the document candidate group. A description in which a document candidate group is acquired through a vector retrieval using a deep learning model will be made in more detail with reference to FIG. 3.

As still another example, the retrieval module 1300 of the apparatus 1000 for summarizing a document may retrieve documents having relevance with the user retrieval query from the retrieval database 1100 using a hybrid retrieval technique in which the above-described text matching-based retrieval and vector retrieval using a deep learning model are combined. More specifically, the retrieval module 1300 of the apparatus 1000 for summarizing a document may acquire a document candidate group based on the relevance score (or similarity score) calculated based on the above-described text matching-based retrieval and the similarity score calculated based on the vector retrieval using a deep learning model. Specifically, the retrieval module 1300 may acquire documents in which a score obtained by summing the relevance score and the similarity score is within a predetermined ranking as a document candidate group. A description in which a document candidate group is acquired through the hybrid retrieval technique will be made in more detail with reference to FIG. 3.

Meanwhile, the retrieval module 1300 according to an embodiment of the present application may be configured to retrieve the retrieval database 1100 by applying a full scan method, which is a method of retrieving all retrieval targets, or a nearest neighbors calculation technique considering a similarity comparison calculation cost between the vectors depending on how many retrieval targets are present in the retrieval database 1100.

The apparatus 1000 for summarizing a document according to an embodiment of the present application may perform an operation of adjusting a retrieval ranking of the documents included in a document candidate group and determining a summarization target document from the documents included in the document candidate group according to the adjusted retrieval ranking. Specifically, a retrieval ranking adjusting module 1400 of the apparatus 1000 for summarizing a document may measure similarity between a document included in a document candidate group and the user retrieval query through a deep learning model and adjust the retrieval ranking of the document included in the document candidate group based on the measured similarity. For example, the retrieval ranking adjusting module 1400 may analyze the user retrieval query and the document in a semantic unit after inputting the user retrieval query and the document included in the document candidate group to a transformer fine-tune model (e.g., a BERT model or a cross-encoder) and adjust the retrieval ranking of the document included in the document candidate group after measuring the similarity between the user retrieval query and the keyword of the document and/or the similarity between the user inquiry vector corresponding to the user retrieval query and the vector in a unit of sentence included in the document. Further, the retrieval ranking adjusting module 1400 may determine a summarization target document based on the adjusted retrieval ranking. A detailed operation of the retrieval ranking adjusting module 1400 will be described in more detail with reference to FIG. 4.

Meanwhile, FIG. 2 shows that the database for storing the original data source is provided outside the apparatus 1000 for summarizing a document and the retrieval database 1100 is included in the apparatus 1000 for summarizing a document. However, this is only illustrative and may be appropriately changed so that the database storing the original data source may be configured integrally with the apparatus 1000 for summarizing a document or the retrieval database 1100 may be configured separately from the apparatus 1000 for summarizing a document, as necessary.

Figure 3:
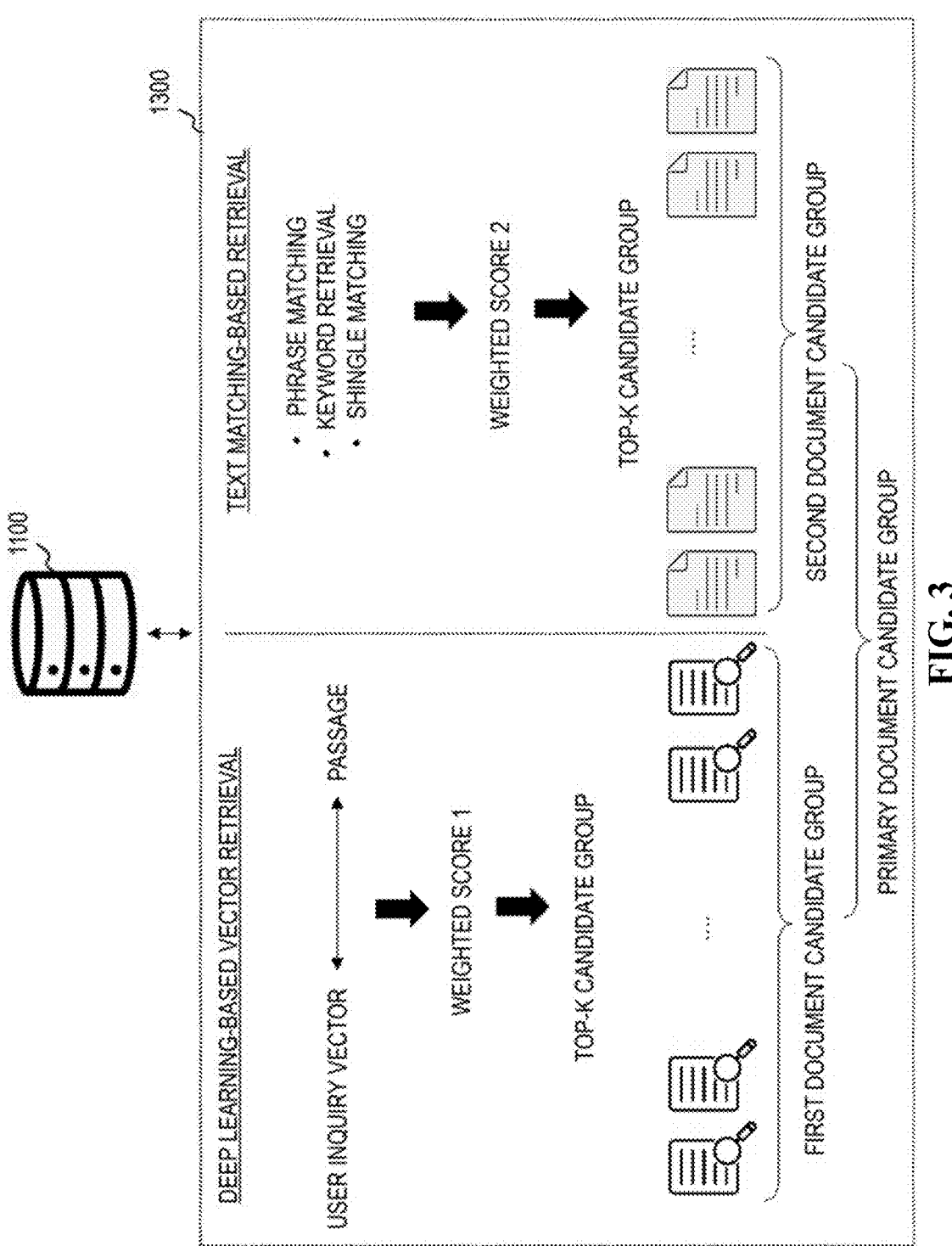
FIG. 3 is a view showing an aspect of extracting a primary document candidate group from a user inquiry (or a user retrieval query) of a retrieval module according to one embodiment of the present application.

FIG. 3 is a view showing an aspect of extracting a primary document candidate group from a user inquiry (or a user retrieval query) of the retrieval module 1300 according to an embodiment of the present application.

The retrieval module 1300 of the apparatus 1000 for summarizing a document according to an embodiment of the present application may be configured to perform an operation of extracting a primary document candidate group based on the user inquiry (or user retrieval query) through a hybrid retrieval in which the deep learning-based vector retrieval and the text matching-based retrieval are combined.

Specifically, the retrieval module 1300 may acquire a user inquiry vector calculated from the user inquiry (or user retrieval query) and acquire a passage stored in the retrieval database 1100. At this time, the retrieval module 1300 may calculate similarity between the user inquiry vector and the passage using a deep learning technique. For example, the retrieval module 1300 may input the user inquiry vector and a vector corresponding to a sentence extracted from the passage to a bi-encoder type deep learning model and acquire a similarity score between the user inquiry vector and the vector corresponding to the sentence extracted from the passage by analyzing similarity between the user inquiry vector and the vector corresponding to the sentence extracted from the passage. For example, the retrieval module 1300 may extract a key sentence of the passage from the passage and calculate a first similarity score between a vector corresponding to the extracted key sentence and the user inquiry vector. For example, the retrieval module 1300 may calculate a second similarity score between a vector corresponding to a sentence summarizing a passage and the user inquiry vector. For example, the retrieval module 1300 may generate a question from the passage through a generation model and calculate a third similarity score between a vector corresponding to the generated sentence and the user inquiry vector. At this time, the retrieval module 1300 may calculate a first weighted score (weighted score 1 in FIG. 3) based on the first similarity score, the second similarity score, and the third similarity score and acquire a first document candidate group including Top-k documents from a plurality of passages stored in the retrieval database 1100 based on the calculated first weighted score. According to an embodiment of the present application, it is possible to enhance retrieval performance by converting the user inquiry in a sentence form and the passage stored in the retrieval database 1100 into a sentence form and calculate the first weighted score and performing vector retrieval in sentence-to-sentence. Meanwhile, when the number of documents related to the user inquiry vector (e.g., documents corresponding to a domain of the user inquiry stored in the retrieval database 1100) is small, the retrieval module 1300 may analyze the above-described similarity between the passage stored in the retrieval database 1100 and the user inquiry vector using a brute force retrieval technique. On the other hand, when the number of documents related to the user inquiry vector (e.g., documents corresponding to the domain of the user inquiry stored in the retrieval database 1100) is big, the retrieval module 1300 may analyze the above-described similarity between the passage stored in the retrieval database 1100 and the user inquiry vector using an approximate nearest neighbor (ANN) algorithm.

Further, the retrieval module 1300 may analyze the similarity (or relevance) between a user inquiry (or user retrieval query) and a passage stored in the retrieval database 1100 using the text matching-based retrieval. For example, the retrieval module 1300 may calculate a first score indicating the similarity (or relevance) between a user inquiry and a passage through a phrase matching method (e.g., using an elastic search match phrase technique). For example, the retrieval module 1300 may calculate a second score indicating the similarity (or relevance) between the user inquiry and the passage based on a degree of matching between key query information including keyword information of the user inquiry extracted from the user inquiry (or user retrieval query) and words included in the passage. For example, the retrieval module 1300 may calculate a third score indicating the similarity (or relevance) between the user inquiry and the passage through a shingle retrieval technique. At this time, the retrieval module 1300 may calculate a second weighted score (weighted score 2 in FIG. 3) based on the first score, the second score, and the third score and acquire a second document candidate group including Top-k documents from a plurality of passages stored in the retrieval database 1100 based on the calculated second weighted score.

Further, the retrieval module 1300 may acquire documents included in the first document candidate group extracted through the vector retrieval and documents included in the second document candidate group extracted through the text matching-based retrieval as a primary document candidate group. At this time, some of the documents included in the first document candidate group and some of the documents included in the second document candidate group may overlap.

Meanwhile, although not shown in FIG. 3, the retrieval module 1300 according to an embodiment of the present application may be configured to limit the retrieval target based on domain information that is previously classified for a domain of the user inquiry (or user retrieval query) and/or each document of the retrieval database 1100 in order to improve retrieval quality and retrieval speed.

Figure 4:
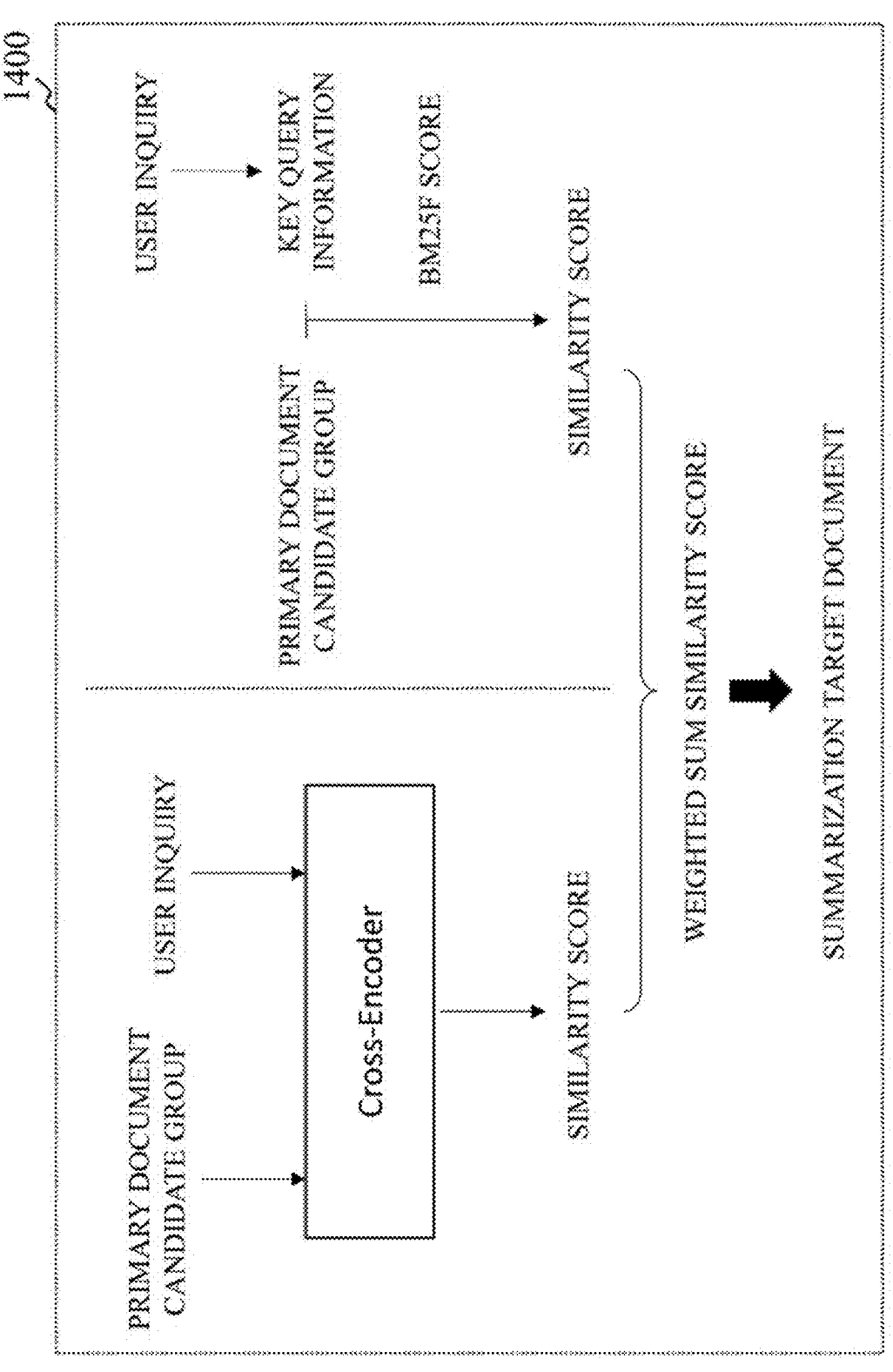
FIG. 4 is a view showing an aspect of determining a summarization target document from the primary document candidate group of a retrieval ranking adjusting module according to an embodiment of the present application.

FIG. 4 is a view showing an aspect of determining a summarization target document from the primary document candidate group of the retrieval ranking adjusting module 1400 according to an embodiment of the present application.

The retrieval ranking adjusting module 1400 of the apparatus 1000 for summarizing a document according to an embodiment of the present application may perform an operation of adjusting a similarity ranking (or relevance ranking) between a document included in the primary document candidate group and a user inquiry.

For example, the retrieval ranking adjusting module 1400 may more precisely analyze similarity between a passage of a document included in the primary document candidate group and a user query using a pre-trained cross-encoder. For example, the retrieval ranking adjusting module 1400 may input the passage (e.g., a sentence extracted from the passage) of the document included in the primary document candidate group and the user query to the pre-trained cross-encoder and acquire a first similarity score between the user inquiry and the document included in the primary document candidate group through the cross-encoder. Since the cross-encoder is pre-trained to predict similarity scores of a first sentence and a second sentence included in a sentence pair after receiving training data consisting of pair of sentences, the cross-encoder may calculate the first similarity score indicating the similarity (or relevance) between the user inquiry and the document included in primary document candidate group based on the user inquiry (e.g., a sentence form) and a sentence (or a sentence extracted from the passage) included in the passage of the document included in the primary document candidate group.

Further, the retrieval ranking adjusting module 1400 may analyze the similarity between a user inquiry and a passage included in a document included in the primary document candidate group based on a keyword. For example, the retrieval ranking adjusting module 1400 may analyze similarity between a keyword included in the user inquiry and a keyword included in the passage included in each document included in the primary document candidate group using a BM25F score algorithm. More specifically, the retrieval ranking adjusting module 1400 may acquire a second similarity score indicating the similarity (or relevance) between a keyword of the user inquiry and the document included in the primary document candidate group by comparing key query information including keyword information extracted from the user inquiry and keyword information included in the passage included in the document included in the primary document candidate group using the BM25F score algorithm.

Further, the retrieval ranking adjusting module 1400 may be configured to calculate a weighted sum similarity score based on the first similarity score calculated through the cross-encoder and the second similarity score analyzing the similarity based on the keyword, which have been described above. At this time, the retrieval ranking adjusting module 1400 may determine a summarization target document based on the weighted sum similarity score. For example, the retrieval ranking adjusting module 1400 may be configured to determine a document corresponding to Top 1 (or Top n) in the order of high weighted sum similarity scores among the documents included in the primary document candidate group as a summarization target document.

As described above, the retrieval module 1300 according to an embodiment of the present application may analyze the similarity between a user inquiry vector and a passage included in a document stored in the retrieval database 1100 using the bi-encoder type deep learning model for which training has been completed. The bi-encoder type deep learning model may be trained by tuning a pre-trained language model (PLM) (e.g., a BERT model). Here, a language model may be pre-trained to analyze correlation between words using training data composed of words of a specific domain (e.g., a legal domain or a financial domain). At this time, the apparatus 1000 for summarizing a document may perform an operation of training the bi-encoder type deep learning model for the purpose of retrieving similar documents by measuring similarity between texts. For example, the apparatus 1000 for summarizing a document may train the bi-encoder type deep learning model using contrastive learning. Specifically, the apparatus 1000 for summarizing a document may train the bi-encoder type deep learning model to output a prediction value so that a distance is closer for a positive sample of a training data (i.e., a pair of samples having similarity of a certain level or more) or the distance is farther for a negative sample (i.e., a pair of samples having similarity less than a certain level). The trained bi-encoder type deep learning model may analyze similarity between a user inquiry vector and an embedding vector of a retrieval target document based on the distance between a vector corresponding to the input sentence and a semantic vector of the document of the retrieval database 1100 previously calculated and stored.

As described above, the retrieval ranking adjusting module 1400 according to an embodiment of the present application may analyze the similarity between a user inquiry and a passage included in a document stored in the retrieval database 1100 using the cross-encoder type deep learning model for which training has been completed. Like the bi-encoder type deep learning model described above, the cross-encoder type deep learning model may also be acquired by tuning the pre-trained language model (PLM) (e.g., a BERT model). Specifically, the apparatus 1000 for summarizing a document may train the cross-encoder type deep learning model for the purpose of retrieving similar documents by measuring similarity between a first sentence and a second sentence using a training data including a sentence pair composed of the first sentence and the second sentence. Specifically, the apparatus 1000 for summarizing a document may be configured to input the training data composed of the first sentence and the second sentence to the cross-encoder type deep learning model and train the cross-encoder type deep learning model to predict the similarity score between the first sentence and the second sentence.

Meanwhile, the training data may include a sentence pair composed of a first sentence corresponding to a question and a second sentence corresponding to an answer. For example, the training data may include a sentence pair composed of a first sentence corresponding to a title and a second sentence corresponding to a question. For example, the training data may include a sentence pair composed of a first sentence corresponding to a question and a second sentence corresponding to a duplicate question. For example, the training data may include a sentence pair including a first sentence corresponding to a title and a second sentence corresponding to an abstract. For example, the training data may include a sentence pair composed of a first sentence corresponding to a query and a second sentence corresponding to a relevant passage (e.g., a passage included in a document clicked by a user). However, the above-described training data is only illustrative, and the cross-encoder type deep learning model may be trained by using training data composed of pairs of arbitrary text data that may be paired in order to achieve the purpose of analyzing similarity between texts.

Meanwhile, FIGS. 2 to 4 show that the cross-encoder type deep learning model for which training has been completed is used to analyze the similarity between documents included in the primary document candidate group and a user inquiry in relation to the retrieval ranking adjusting module 1400. However, this is only for convenience of description, and the cross-encoder type deep learning model for which training has been completed may be implemented to be used by the retrieval module 1300 to extract a document including a passage similar to a user inquiry included in the retrieval database 1100, as necessary.

Figure 5:
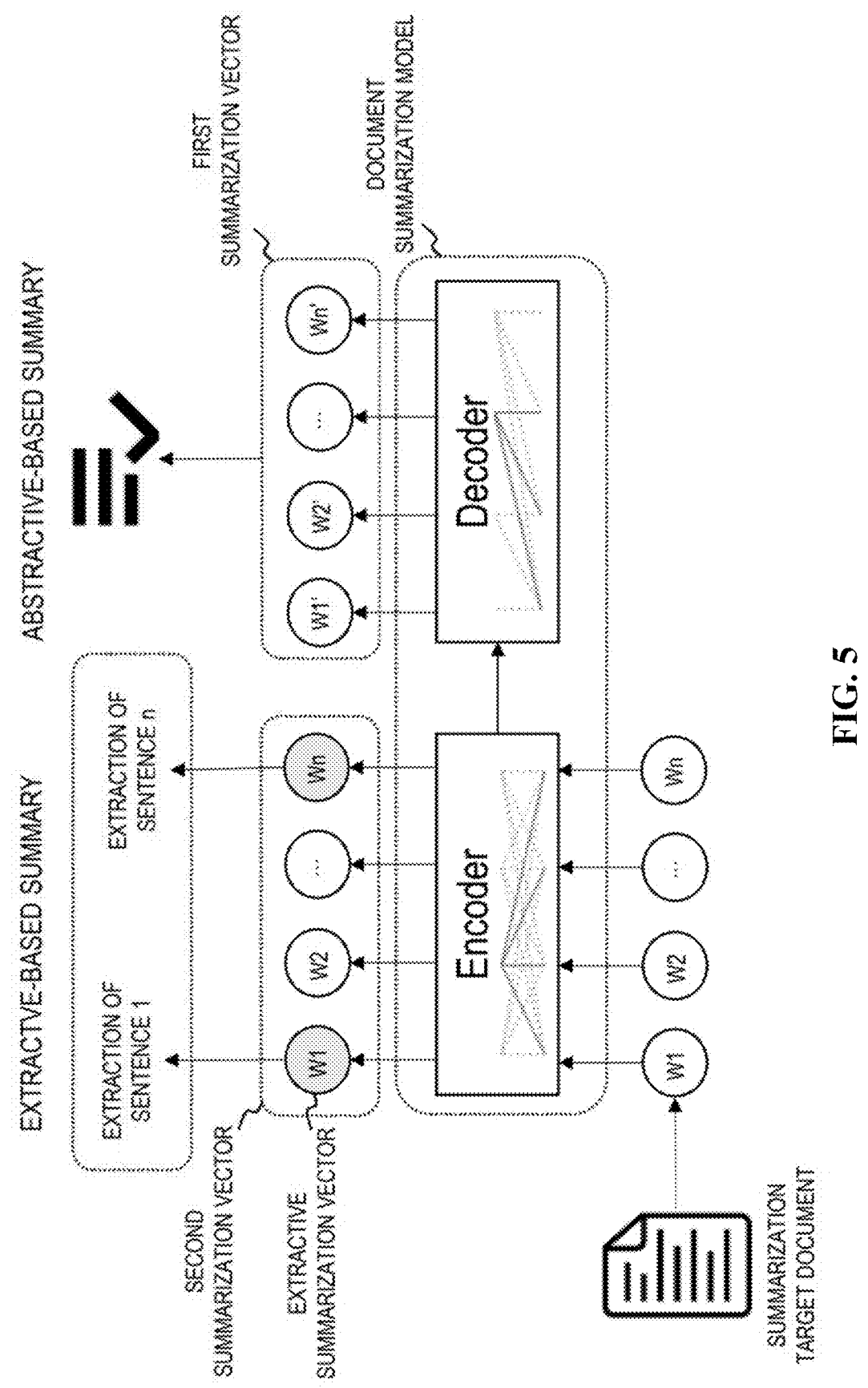
FIG. 5 is a view showing an operation of generating a summary through a document summarization model of the apparatus for summarizing a document according to an embodiment of the present application.

FIG. 5 is a view showing an operation of generating a summary through a document summarization model of the apparatus 1000 for summarizing a document according to an embodiment of the present application.

The apparatus 1000 for summarizing a document according to an embodiment of the present application may generate an abstractive summarization-based first summary and/or an extractive summarization-based second summary from a summarization target document.

For example, the apparatus 1000 for summarizing the document may generate the abstractive summarization-based first summary from the summarization target document through the document summarization model for which training has been completed. Specifically, the apparatus 1000 for summarizing a document may be configured to input vectors (e.g., W1, W2, Wn, and the like in FIG. 5) converting sentences included in the summarization target document for each sentence unit to an encoder of the document summarization model for which training has been completed, extract a feature vector through the encoder, and acquire first summarization vectors (e.g., W1', W2', Wn', and the like in FIG. 5) from the feature vector through a decoder. In this case, the apparatus 1000 for summarizing a document may generate the abstractive summarization-based first summary from the first summarization vector. Since the document summarization model has been trained to output output data so as to be approximate to the summarization vector corresponding to a sentence included in an abstractive summary correct answer from the vector corresponding to the sentence included in the original document using a training data set composed of the original document and the abstractive summary correct answer (abstractive summary correct answer information), the document summarization model may output an abstractive summarization-based summary (or first summarization vector for generating the abstractive summarization-based summary) from the summarization target document.

For example, the apparatus 1000 for summarizing a document may generate the extractive summarization-based second summary from the summarization target document through the document summarization model for which training has been completed. Specifically, the apparatus 1000 for summarizing a document may be configured to input the vectors (e.g., W1, W2, Wn, and the like in FIG. 5) converting the sentences included in the summarization target document for each sentence unit to the encoder of the document summarization model for which training has been completed and acquire second summarization vectors (e.g., W1, W2, Wn, and the like in FIG. 5) through the output layer of the encoder. In this case, the apparatus 1000 for summarizing a document may determine extractive summarization vectors (e.g., W1 and Wn in FIG. 5) for generating the second summary among the second summarization vectors, extract sentences (e.g., sentence 1 and sentence n in FIG. 5) of the summarization target document based on the determined extractive summarization vector, and generate the second summary based on the extracted sentences. The document summarization model may be implemented to determine the second summarization vector corresponding to sentences having relatively high similarity as the extractive summarization vector (e.g., W1 and Wn in FIG. 5) by comparing similarity between a sentence included in the abstractive summary correct answer of the training data set and a sentence included in the original document and generate the second summary based on sentences (e.g., a sentence 1 and a sentence 2) corresponding to the determined extractive summarization vector.

A method for generating a summary and training the document summarization model for generating the summary will be described in more detail with reference to FIGS. 11 to 13.

Hereinafter, the method of retrieving a document, the method of summarizing a document, and the method of training the document summarization model according to an embodiment of the present application will be described in more detail with reference to FIGS. 6 to 13. In describing the method of retrieving a document, the method of summarizing a document, and the method of training the document summarization model according to an embodiment of the present application, some embodiments overlapping those previously described with reference to FIGS. 2 to 5 may be omitted. However, this is only for convenience of description and should not be construed as being limited thereto.

Figure 6:
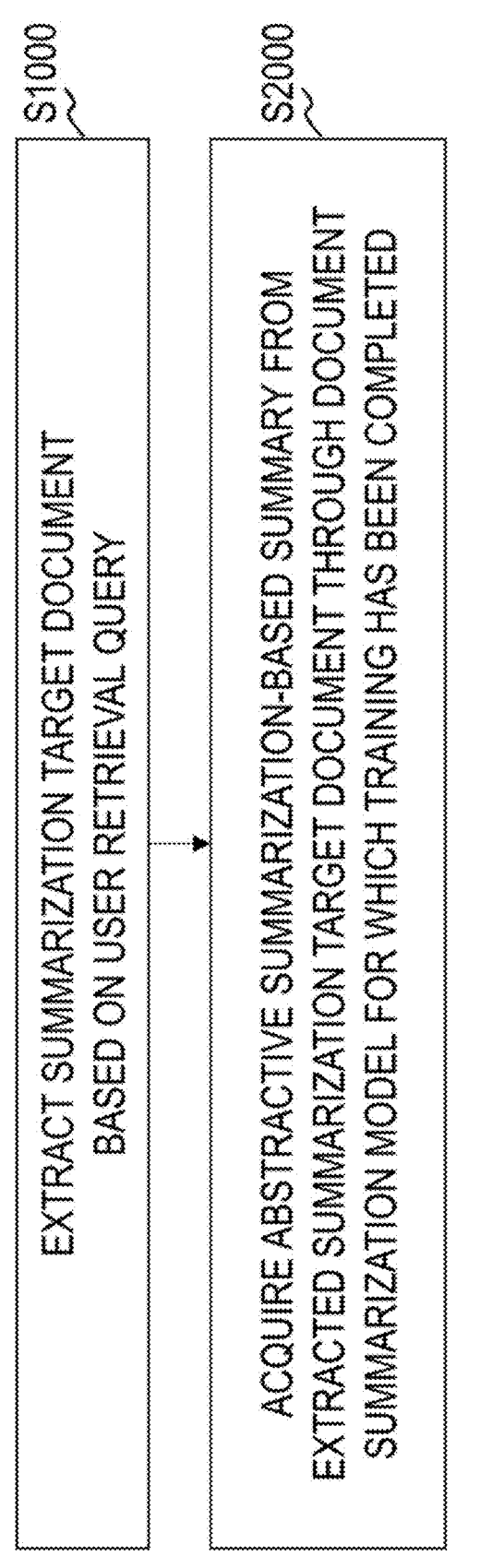
FIG. 6 is a flowchart showing a method for retrieving a document and a method of summarizing a document according to an embodiment of the present application.

FIG. 6 is a flowchart showing a method for retrieving a document and a method of summarizing a document according to an embodiment of the present application.

The method of summarizing a document according to an embodiment of the present application may include a step S1000 of extracting a summarization target document based on a user retrieval query and a step S2000 of acquiring an abstractive summarization-based summary from the extracted summarization target document through a document summarization model for which training has been completed.

In the step S1000 of extracting a summarization target document based on a user retrieval query, the apparatus 1000 for summarizing a document may retrieve a retrieval database based on the user retrieval query and determine a document candidate group including one or more documents. Further, in the step S1000 of extracting a summarization target document based on a user retrieval query, the apparatus 1000 for summarizing a document may determine the summarization target document among the extracted document candidate groups through similarity analysis between the content of the document included in the extracted document candidate group and the user retrieval query. A description in which the summarization target document is extracted will be made in more detail with reference to FIGS. 7 to 10.

In the step S2000 of acquiring an abstractive summarization-based summary from the extracted summarization target document through a document summarization model for which training has been completed, the apparatus 1000 for summarizing a document may input the extracted summarization target document to the document summarization model for which training has been completed, acquire a first summarization vector through the document summarization model, and generate an abstractive summarization-based first summary. A description in which the summary is acquired will be described in more detail in FIGS. 11 to 13.

FIG. 7 is a flowchart specifically showing the step S1000 of extracting a summarization target document according to an embodiment of the present application.

The step S1000 of extracting a summarization target document according to an embodiment of the present application may further include a step S1100 of acquiring a user retrieval query, a step S1200 of calculating a vector in a unit of sentence from the user retrieval query and acquiring a first document candidate group based on the similarity between the calculated vector and an embedding vector of the document stored in the retrieval database 1100, a step S1300 of acquiring a second document candidate group based on the similarity between the text included in the user retrieval query and the text of the document stored in the retrieval database, and a step S1400 of determining a summarization target document based on the first document candidate group and the second document candidate group.

In the step S1100 of acquiring a user retrieval query, the apparatus 1000 for summarizing a document may acquire the user retrieval query requesting a document retrieval from the user device through the transceiver 1010. Here, the user retrieval query may be used as a meaning including information for retrieval in an arbitrarily suitable form, including a keyword form, a sentence in a natural language form, and a vector form.

In the step S1200 of calculating a vector in a unit of sentence from the user retrieval query and acquiring a first document candidate group based on the similarity between the calculated vector and an embedding vector of the document stored in the retrieval database 1100, the apparatus 1000 for summarizing a document may retrieve the document having relevance with the user retrieval query from the retrieval database 1100.

FIG. 8 is a flowchart specifically showing the step S1200 of acquiring a first document candidate group according to an embodiment of the present application.

The step S1200 of acquiring a first document candidate group according to an embodiment of the present application may further include a step S1210 of calculating a first similarity score between the user inquiry vector and a sentence vector extracted from a passage of the document stored in the retrieval database 1100, a step S1220 of calculating a second similarity score between the user inquiry vector and a sentence vector summarizing the passage of the document stored in the retrieval database, a step S1230 of calculating a third similarity score between a question vector generated from the passage stored in the retrieval database and the user inquiry vector through a generation model, and a step S1240 of calculating a first weighted score based on the first similarity score, the second similarity score, and the third similarity score and determining the first document candidate group based on the calculated first weighted score.

Specifically, in the step S1200 of acquiring a first document candidate group, the retrieval module 1300 may be configured to input the user inquiry vector and a sentence vector acquired from the passage of the document stored in the retrieval database to a trained bi-encoder type deep learning model.

For example, the retrieval module 1300 may extract a key sentence from the passage of the document stored in the retrieval database 1100 and calculate a first similarity score between the user inquiry vector and a sentence vector corresponding to the extracted key sentence through the trained bi-encoder type deep learning model (S1210).

For example, the retrieval module 1300 may calculate a second similarity score between a sentence vector corresponding to a sentence summarizing the passage of the document stored in the retrieval database 1100 and the user inquiry vector (S1220).

For example, the retrieval module 1300 may generate a question in a sentence form from the passage of the document stored in the retrieval database 1100 through a generation model and calculate a third similarity score between a sentence vector corresponding to the generated inquiry and the user inquiry vector (S1230).

Further, the retrieval module 1300 may calculate a first weighted score based on the first similarity score, the second similarity score, and the third similarity score and acquire the first document candidate group including Top-k documents from a plurality of passages stored in the retrieval database 1100 based on the calculated first weighted score (S1240).

Referring back to FIG. 7, the method for retrieving a document according to an embodiment of the present application may include the step S1300 of acquiring a second document candidate group based on the similarity between the text included in the user retrieval query and the text of the document stored in the retrieval database 1100. In the step S1300 of acquiring a second document candidate group, the retrieval module 1300 may calculate a score indicating the similarity between the text included in the user retrieval query and the text of the document stored in the retrieval database through a text matching-based retrieval and acquire the second document candidate group based on the calculated score.

FIG. 9 is a flowchart specifically showing the step S1300 of acquiring a second document candidate group according to an embodiment of the present application.

The step S1300 of acquiring a second document candidate group according to an embodiment of the present application may further include a step S1310 of calculating a first score indicating the similarity between the user retrieval query and a passage stored in the retrieval database through a phrase matching, a step S1320 of calculating a second score indicating the similarity between key query information including a keyword of the user retrieval query extracted through a user query analysis module and a keyword included in the passage stored in the retrieval database, a step S1330 of calculating a third score indicating the similarity between the user retrieval query and the passage stored in the retrieval database through a shingle matching, and a step S1340 of calculating a second weighted score based on the first score, the second score, and the third score and determining the second document candidate group based on the calculated second weighted score.

Referring back to FIG. 7, in the step S1400 of determining a summarization target document based on the first document candidate group and the second document candidate group, the retrieval module 1300 of the apparatus 1000 for summarizing a document may determine the summarization target document based on the first document candidate group acquired through the step S1200 and the second document candidate group acquired through the step S1300. For example, the retrieval module 1300 may sum the similarity score calculated based on the vector retrieval in the step S1200 and the relevance score calculated based on the keyword-based retrieval in the step S1300 and determine a document in which the summed score is within a predetermined ranking as the summarization target document.

Meanwhile, according to an embodiment of the present application, the apparatus 1000 for summarizing a document may be implemented to adjust the retrieval ranking of the documents included in the first and second document candidate groups and determine a summarization target document based on the adjusted retrieval ranking.

FIG. 10 is a flowchart specifically showing the step S1400 of determining a summarization target document according to an embodiment of the present application.

The step S1400 of determining a summarization target document according to an embodiment of the present application may further include a step S1410 of acquiring the documents included in the first document candidate group and the documents included in the second document candidate group as a primary document candidate group and a step S1420 of selecting a summarization target document from the primary document candidate group by analyzing the similarity between a content of the candidate document included in the primary document candidate group and the user retrieval query through the retrieval ranking adjusting module 1400.

In the step S1410 of acquiring the documents included in the first document candidate group and the documents included in the second document candidate group as the primary document candidate group, the retrieval ranking adjusting module 1400 of the apparatus 1000 for summarizing a document may acquire the primary document candidate group including the documents included in the first document candidate group retrieved through the vector retrieval and the documents included in the second document candidate group retrieved through the keyword retrieval.

In the step S1420 of selecting a summarization target document from the primary document candidate group by analyzing the similarity between the content of the candidate document included in the primary document candidate group and the user retrieval query through the retrieval ranking adjusting module 1400, the apparatus 1000 for summarizing a document may adjust retrieval rankings of the candidate documents included in the primary document candidate group through the retrieval ranking adjusting module 1400 and determine a summarization target document from the candidate documents included in the primary document candidate group according the adjusted retrieval ranking.

For example, the retrieval ranking adjusting module 1400 may measure the similarity between the candidate document included in the primary document candidate group and the user retrieval query through a deep learning model and adjust the retrieval ranking of the candidate document included in the primary document candidate group based on the measured similarity. For example, the retrieval ranking adjusting module 1400 may calculate the similarity score indicating semantic similarity between the candidate document and the user retrieval query from the candidate document included in the primary document candidate group and the user retrieval query using a trained cross-encoder type deep learning model.

For example, the retrieval ranking adjusting module 1400 may calculate the similarity score between the key query information extracted from the user retrieval query and the keyword included in the candidate document included in the primary document candidate group using a BM25F score calculation algorithm.

At this time, the retrieval ranking adjusting module 1400 may calculate a weighted sum similarity score for each candidate document included in the primary document candidate group based on the similarity score calculated by using the trained cross-encoder type deep learning model and the similarity score calculated by using the BM25F score calculation algorithm and adjust the ranking of the candidate documents included in the primary document candidate group based on the weighted sum similarity score. Further, the retrieval ranking adjusting module 1400 may be configured to determine a summarization target document based on the adjusted ranking.

FIG. 11 is a flowchart specifically showing the step S2000 of acquiring an abstractive summarization-based summary from the extracted summarization target document according to an embodiment of the present application.

The step S2000 of acquiring an abstractive summarization-based summary from the extracted summarization target document according to an embodiment of the present application may further include a step S2100 of inputting the summarization target document to an input layer of the document summarization model for which training has been completed, a step S2200 of acquiring a first summarization vector through a first output layer of the document summarization model and generating an abstractive summarization-based summary based on the first summarization vector, and a step S2300 of acquiring a second summarization vector through a second output layer of the document summarization model and generating an extractive summarization-based summary based on the second summarization vector.

In the step S2100 of inputting the summarization target document to an input layer of the document summarization model for which training has been completed, the apparatus 1000 for summarizing a document may acquire the document summarization model for which training has been completed. Here, when the document summarization model for which training has been completed is acquired, it may mean that any data for appropriately executing the document summarization model, including calculation information, structure information, layer information, and/or parameter information of the document summarization model for which training has been completed is acquired. Further, the apparatus 1000 for summarizing a document may input the summarization target document extracted through the step S1000 to the input layer of the document summarization model for which training has been completed. Specifically, the apparatus 1000 for summarizing a document may input a vector Wi converting sentences included in the summarization target document in a unit of sentence to the input layer of the document summarization model for which training has been completed.

Meanwhile, the document summarization model according to an embodiment of the present application may be composed of an encoder and a decoder. The encoder may extract a feature vector from the vector Wi corresponding to each sentence included in the summarization target document. At this time, the decoder may be configured to output a summarization vector Wi' for generating the abstractive summarization-based summary from the feature vector. Meanwhile, the encoder according to an embodiment of the present application may be in the form of a bidirectional encoder capable of learning a context and the decoder may be in the form of an autoregressive decoder capable of learning causality between a previous context and a subsequent sequence.

Specifically, the apparatus 1000 for summarizing a document may input the vector Wi converting the sentences included in the summarization target document for each sentence to the input layer of the encoder of the document summarization model for which training has been completed.

In the step S2200 of acquiring a first summarization vector through a first output layer of the document summarization model and generating an abstractive summarization-based summary based on the first summarization vector, the apparatus 1000 for summarizing a document may acquire the first summarization vector Wi' corresponding to the vector Wi of the sentence included in the summarization target document through the first output layer. Specifically, the apparatus 1000 for summarizing a document may acquire the first summarization vector Wi' through the first output layer of the decoder of the document summarization model. In this case, the apparatus 1000 for summarizing a document may generate the abstractive summarization-based first summary from the first summarization vector. As will be described below, since the document summarization model has been trained to output output data so as to be approximate to the summarization vector W' corresponding to a sentence Si' included in the abstractive summarization correct answer from the vector Wi corresponding to a sentence Si included in the original document using a training data set composed of the original document and the abstractive summarization correct answer, the document summarization model may output the abstractive summarization-based summary (or the first summarization vector for generating the abstractive summarization-based summary) from the summarization target document.

In the step S2300 of acquiring a second summarization vector through a second output layer of the document summarization model and generating the extractive summarization-based summary based on the second summarization vector, the apparatus 1000 for summarizing a document may acquire the second summarization vector Wi corresponding to the vector Wi of the sentence included in the summarization target document through the second output layer. Specifically, the apparatus 1000 for summarizing a document may acquire the first summarization vector Wi' through the second output layer of the encoder of the document summarization model. At this time, the apparatus 1000 for summarizing a document may generate an extractive summarization-based second summary from the second summarization vector. At this time, the apparatus 1000 for summarizing a document may determine an extractive summarization vector for generating the second summary among the second summarization vectors, extract sentences of the summarization target document based on the determined extractive summarization vector, and generate the second summary based on the extracted sentences. As will be described below, the document summarization model may be implemented to determine the second summarization vector corresponding to sentences having relatively high similarity as the extractive summarization vector by comparing similarity between a sentence included in the abstractive summarization correct answer of the training data set and a sentence included in the original document and generate the extractive summarization-based second summary based on the sentence corresponding to the determined extractive summarization vector.

Hereinafter, a method of training a document summarization model and a training data set for training the document summarization model according to on embodiment of this application will be described in more detail with reference to FIGS. 12 and 13.

Figure 12:
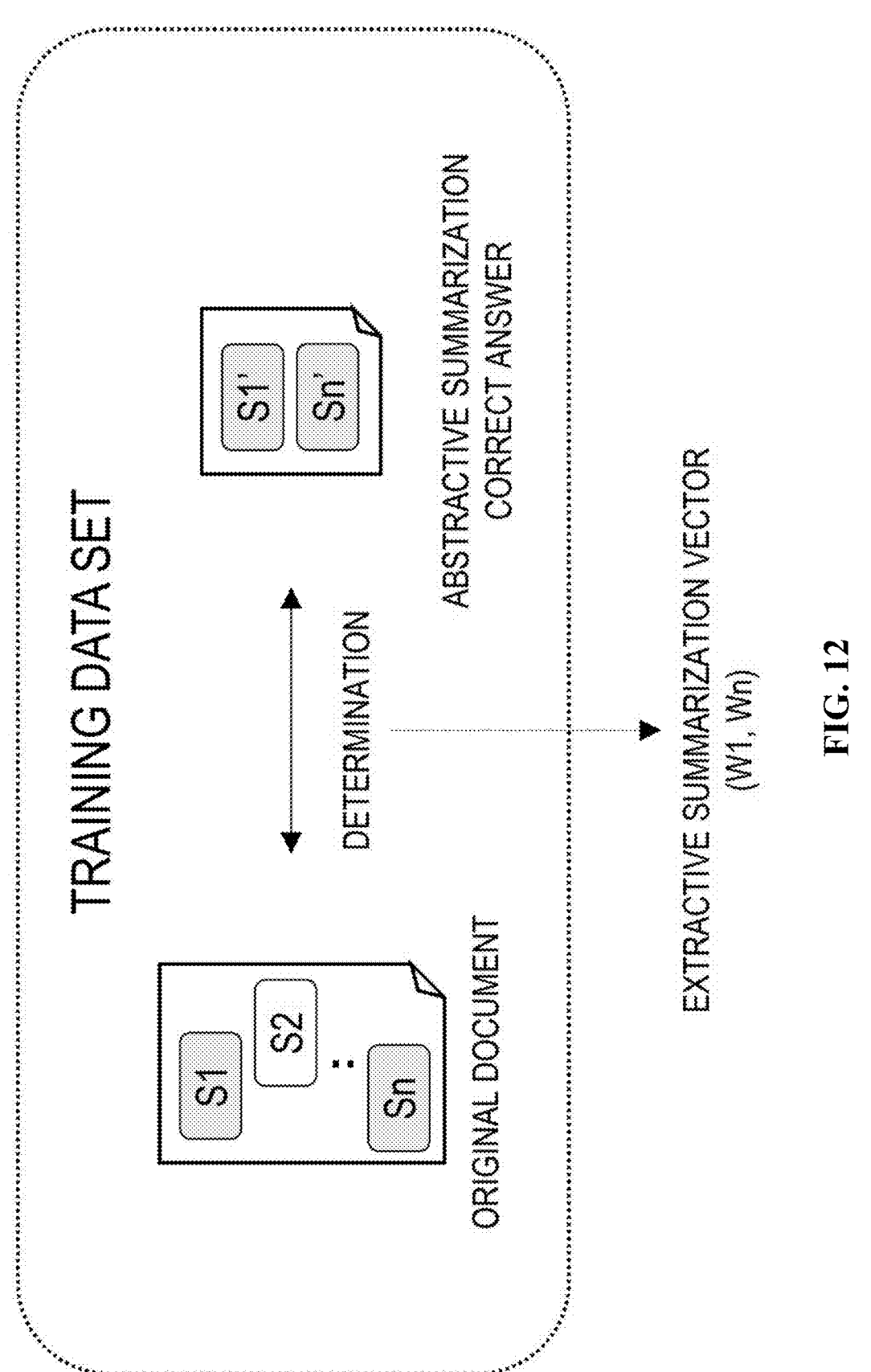
FIG. 12 is a view for describing a training data set for training a document summarization model according to an embodiment of the present application.

FIG. 12 is a view for describing a training data set for training a document summarization model according to an embodiment of the present application.

A training data set for training the document summarization model may be composed of the original document and the abstractive summarization correct answer. The original document may be composed of one or more sentences (e.g., a sentence 1 (S1), a sentence 2 (S2), and a sentence N (Sn) in FIG. 12), and the abstractive summarization correct answer is a correct answer obtained by performing the abstractive summarization for the original document and may be composed of one or more sentences (e.g., a summary sentence 1 (S1') and a summary sentence N (Sn') in FIG. 12).

Meanwhile, FIG. 12 shows that the training data set is configured in a sentence form, but this is only an example for convenience of description, and the training data set may be configured in a vector form vectorizing each sentence of the original document and the abstractive summarization correct answer.

Figure 13:
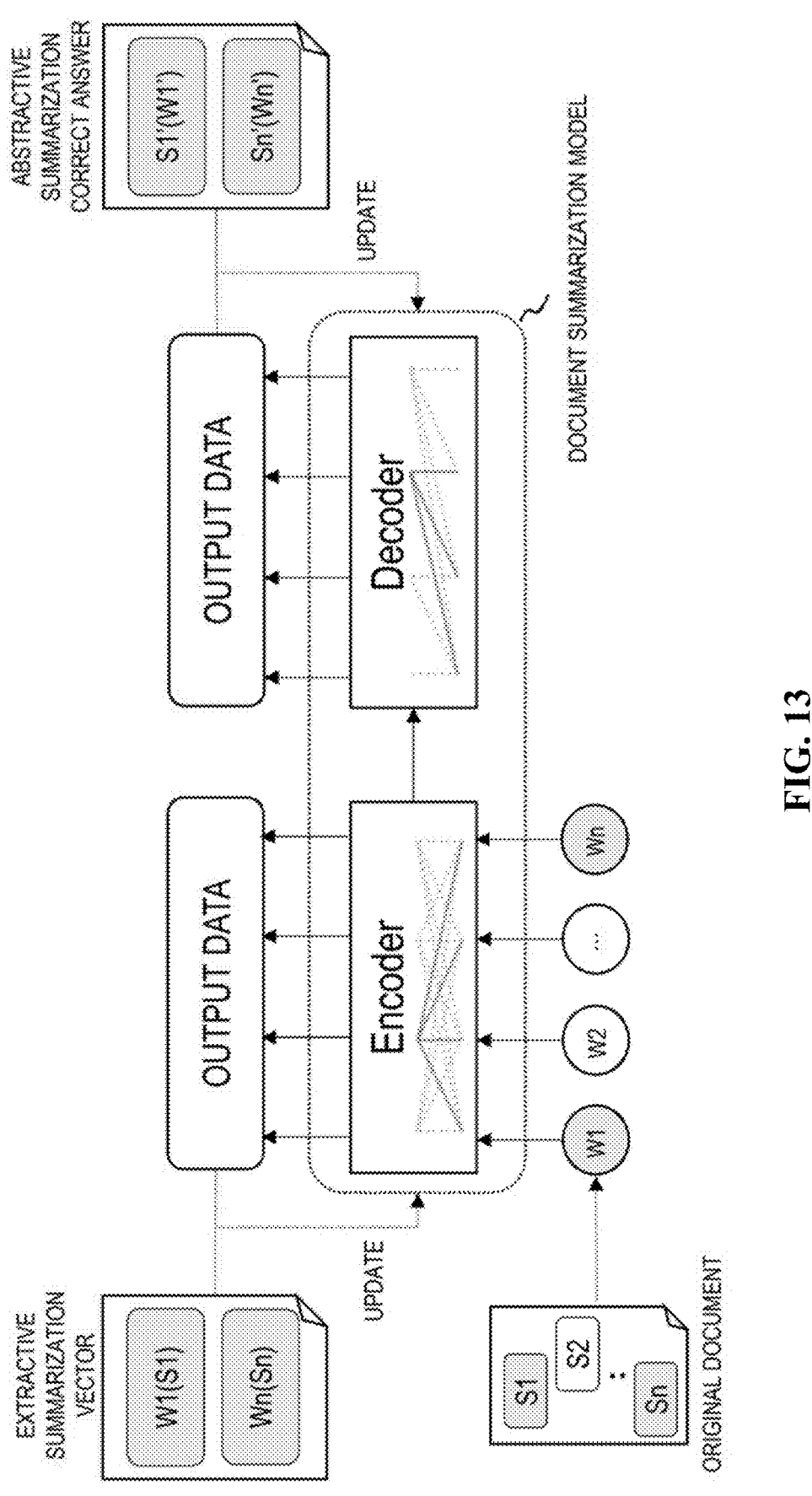
FIG. 13 is a view showing an aspect of training the document summarization model according to an embodiment of the present application.

FIG. 13 is a view showing an aspect of training the document summarization model according to an embodiment of the present application.

The apparatus 1000 for summarizing a document according to an embodiment of the present application may train the document summarization model based on the training data set described above. Specifically, the apparatus 1000 for summarizing a document may be configured to input a vector (e.g., vector 1 (W1) corresponding to the sentence 1 (S1), vector 2 (W2) corresponding to the sentence 2 (S2), or vector N (Wn) corresponding to the sentence N in FIG. 13), which has vectorized each sentence (e.g., sentence 1 (S1), sentence 2 (S2), or sentence N (Sn)) of the original document included in the training data set, to the input layer of the document summarization model. In this case, the encoder of the document summarization model may extract the feature vector from each vector, and the decoder of the document summarization model may output output data in a vector form based on the feature vector through the first output layer. At this time, the apparatus 1000 for summarizing a document may train the document summarization model based on the vector (e.g., the summary vector 1 (W1') corresponding to the summary sentence 1 (S1') or the summary vector N (Wn') corresponding to the summary sentence N in FIG. 13), which has vectorized each summary sentence (e.g., the summary sentence 1 (S1') or the summary sentence N (Sn') in FIG. 13) of the abstractive summarization correct answer of the training data set, and the output data. Specifically, the apparatus 1000 for summarizing a document may update a parameter of the document summarization model so as to output the output data by approximating the summarization vector (or the summary sentence) of the abstractive summarization correct answer based on a difference between the summarization vector (or the summary sentence) of the abstractive summarization answer and the output data.

Furthermore, the apparatus 1000 for summarizing a document according to an embodiment of the present application may train the document summarization model to output the summarization vector for generating an extractive summarization-based summary. Referring back to FIG. 12, the apparatus 1000 for summarizing a document may determine the extractive summarization vector (e.g., W1 or Wn in FIG. 12) for generating the extractive summarization-based summary by analyzing the similarity between the original document and the abstractive summarization correct answer of the training data set used for generating the abstractive summarization-based summary. For example, the apparatus 1000 for summarizing a document may analyze similarity between the sentence Si' of the abstractive summarization correct answer and the sentence Si of the original document and determine the vector W1 corresponding to the sentence having relatively high similarity, that is, the sentence 1 (S1) of the original document having high similarity with the summary sentence 1 (S1') of the abstractive summarization correct answer and the vector Wn corresponding to the sentence N (Sn) of the original document having high similarity with the summary sentence N (Sn') of the abstractive summarization correct answer as the extractive summarization vector (W1 or Wn in FIG. 12).

At this time, the apparatus 1000 for summarizing a document may train the document summarization model so that the document summarization model outputs the extractive summarization vector (or the sentence corresponding to the extractive summarization vector) through the second output layer. For example, the apparatus 1000 for summarizing a document may train the document summarization model so that the document summarization model outputs the extractive summarization vector (e.g., W1 or Wn) or the sentence (e.g., sentence 1 (S1) corresponding to W1 or sentence N (Sn) corresponding to Wn) corresponding to the extractive summarization vector through the second output layer of the encoder.

According to an embodiment of the present application, the document summarization model for which training has been completed may generate the first summarization vector for generating the abstractive summarization-based summary and the second summarization vector for generating the extractive summarization-based summary based on the summarization target document, and the apparatus 1000 for summarizing a document may generate the abstractive summarization-based summary based on the first summarization vector and generate the extractive summarization-based summary based on the second summarization vector. The method for summarizing a document and the apparatus for summarizing a document according to an embodiment of the present application may be applied to providing a summary of an arbitrary report. Specifically, the summary of the report may be provided by primarily retrieving paragraphs or documents related to each title or topic of the report and generating a summary of the retrieved paragraphs or documents to match the generated summary with a portion corresponding to the table of contents of the report.

Further, the method of summarizing a document and the apparatus for summarizing a document according to an embodiment of the present application may be applied to providing a news curation function. Specifically, the method of summarizing a document and the apparatus for summarizing a document according to an embodiment of the present application may be applied to a service that generates a summary of a news corresponding to a specific category selected by a user and provides the generated summary and a link to an original news together or that retrieves a related news when the user searches a news in the form of a natural language and generates a summary of the related news.

According to the method and apparatus for retrieving a document according to an embodiment of the present application, it is possible to combine the vector-based retrieval and the text matching-based retrieval, thereby reducing the amount of calculation and maintaining the retrieval quality.

According to the method and apparatus for retrieving a document according to an embodiment of the present application, it is possible to enhance the performance and accuracy of the vector retrieval by performing the vector retrieval in a sentence-to-sentence manner.

According to the method of summarizing the document and the apparatus for summarizing a document according to the embodiment of the present application, the abstractive summarization-based summary and the extractive summarization-based summary may be simultaneously provided. Specifically, according to the method of summarizing a document and the apparatus for summarizing a document according to the embodiment of the present application, by training the document summarization model capable of providing the abstractive summarization function and the extractive summarization function with only the training data set for the abstractive summarization, it is possible to simultaneously provide the abstractive summarization-based summary and the extractive summarization-based summary.

Various operations of the apparatus 1000 for summarizing a document described above may be stored in the memory 1020 of the apparatus 1000 for summarizing a document, and the processor 1030 of the apparatus 1000 for summarizing a document may be provided to perform the operations stored in the memory 1020.

The features, structures, effects, and the like described above in the embodiments are included in at least one embodiment of the present disclosure and are not necessarily limited to only one embodiment. Furthermore, the features, structures, effects, and the like described in each embodiment may be combined or modified by those skilled in the art to which the embodiments pertain and carried out in other embodiments. Therefore, contents related to these combinations and modifications should be construed as being included in the scope of the present disclosure.

In addition, although the embodiment has been described above, this is only illustrative and does not limit the present disclosure, and those skilled in the art to which the present disclosure pertains will be able to understand that various modifications and applications not described above are possible without departing from the essential characteristics of the embodiments. In other words, each component specifically shown in the embodiments can be modified. In addition, differences related to these modifications and applications should be construed as being included in the scope of the present disclosure as defined in the appended claims.

According to the method and apparatus for retrieving a document according to an embodiment of the present application, it is possible to combine the vector-based retrieval and the text matching-based retrieval, thereby reducing the amount of calculation and maintaining the retrieval quality.

According to the method and apparatus for retrieving a document according to an embodiment of the present application, it is possible to enhance the performance and accuracy of the vector retrieval by performing the vector retrieval in a sentence-to-sentence manner.

According to the method and apparatus for summarizing a document according to an embodiment of the present application, the user can perform the document operations based on the relatively natural abstractive summarization result, thereby performing the document operations more efficiently and quickly.

According to the method and apparatus for summarizing the document according to an embodiment of the present application, it is possible to simultaneously provide the abstractive summarization-based summary and the extractive summarization-based summary.

According to the method and apparatus for summarizing a document according to an embodiment of the present application, it is possible to simultaneously provide the abstractive summarization-based summary and the extractive summarization-based summary by training the document summarization model capable of providing the abstractive summarization and extractive summarization functions with only the training data set for the abstractive summarization.

The effects of the present disclosure are not limited to the above-described effects, and other effects not mentioned will be able to be clearly understood by those skilled in the art to which the present disclosure pertains from the specification and the accompanying drawings.

What is claimed is:

1. A method for summarizing a document, by an apparatus for summarizing a document, the method comprising:

acquiring a user inquiry vector from a user retrieval query;

extracting a key sentence of a passage of a document stored in a retrieval database from the passage of the document;

calculating a first similarity score between the user inquiry vector and a sentence vector corresponding to the key sentence extracted from the passage of the document by inputting the user inquiry vector and the sentence vector to a bi-encoder of a bi-encoder type deep learning model;

calculating a second similarity score between the user inquiry vector and a sentence vector corresponding to a sentence summarizing the passage of the document stored in the retrieval database;

generating a question from the passage of the document stored in the retrieval database through a generation model;

calculating a third similarity score between a question vector corresponding to the question generated from the passage stored in the retrieval database and the user inquiry vector;

calculating a first weighted score based on the first similarity score, the second similarity score, and the third similarity score;

determining a first document candidate group including first documents based on the calculated first weighted score;

calculating a first score indicating similarity between the user retrieval query and a passage stored in the retrieval database through a phrase matching;

calculating a second score indicating similarity between key query information including a keyword of the user retrieval query extracted through a user query analysis module and a keyword included in the passage stored in the retrieval database;

calculating a third score indicating similarity between the user retrieval query and the passage stored in the retrieval database through a shingle matching;

calculating a second weighted score based on the first score, the second score, and the third score;

determining a second document candidate group including second documents based on the calculated second weighted score;

acquiring a primary document candidate group including the first documents of the first document candidate group and the second documents of the second document candidate group;

calculating a fourth score indicating similarity between a passage of a document in the primary document candidate group and the user retrieval query by inputting the passage of the document in the primary document candidate group and the user retrieval query to a cross-encoder of cross-encoder type deep learning model;

calculating a fifth score indicating similarity between the key query information including the keyword of the user retrieval query and a keyword included in the passage of the document in the primary document candidate group using a score calculation algorithm;

calculating a weighted sum similarity score based on the fourth score and the fifth score and adjusting a ranking of documents in the primary document candidate group based on the weighted sum similarity score;

determining a summarization target document based on the adjusted ranking of the documents; and generating an abstractive summarization-based first summary through a first output layer of a trained document summarization model and an extractive summarization-based second summary through a second output layer of the trained document summarization model by inputting the determined summarization target document to the trained document summarization model.

2. The method of claim 1, wherein the acquiring the user inquiry vector from the user retrieval query includes:

acquiring the user inquiry vector in a unit of sentence from the user retrieval query.

3. The method of claim 1, further comprising:

generating a question to specify the user retrieval query based on the user retrieval query using the generation model when the user retrieval query is not recognized, transmitting the generated question to a user terminal, and receiving a user retrieval query corresponding to the transmitted question from the user terminal.

4. The method of claim 1, wherein the score calculation algorithm includes a BM25F score calculation algorithm.

5. The method of claim 1, wherein the determining the summarization target document based on the adjusted ranking includes:

determining a document in order of the adjusted ranking among the documents included in the primary document candidate group as the summarization target document.

6. The method of claim 1, wherein the generating of the abstractive summarization-based first summary and the extractive summarization-based second summary includes:

inputting the determined summarization target document to an input layer of the trained document summarization model;

acquiring a first summarization vector through the first output layer of the trained document summarization model;

generating the abstractive summarization-based first summary based on the first summarization vector;

acquiring a second summarization vector through the second output layer of the trained document summarization model; and generating the extractive summarization-based second summary based on the second summarization vector.

7. A non-transitory computer-readable recording medium in which a computer program executed by a computer to perform operations is recorded, the operations comprising:

acquiring a user inquiry vector from the user retrieval query;

extracting a key sentence of a passage of a document stored in a retrieval database from the passage of the document;

calculating a first similarity score between the user inquiry vector and a sentence vector corresponding to the key sentence extracted from the passage of the document by inputting the user inquiry vector and the sentence vector to a bi-encoder of a pre-trained bi-encoder type deep learning model;

calculating a second similarity score between the user inquiry vector and a sentence vector corresponding to a sentence summarizing the passage of the document stored in the retrieval database;

generating a question from the passage of the document stored in the retrieval database through a generation model;

calculating a third similarity score between a question vector corresponding to the question generated from the passage stored in the retrieval database and the user inquiry vector;

calculating a first weighted score based on the first similarity score, the second similarity score, and the third similarity score;

determining a first document candidate group including first documents based on the calculated first weighted score;

calculating a first score indicating similarity between the user retrieval query and a passage stored in the retrieval database through a phrase matching;

calculating a second score indicating similarity between key query information including a keyword of the user retrieval query extracted through a user query analysis module and a keyword included in the passage stored in the retrieval database;

calculating a third score indicating similarity between the user retrieval query and the passage stored in the retrieval database through a shingle matching;

calculating a second weighted score based on the first score, the second score, and the third score;

determining a second document candidate group including second documents based on the calculated second weighted score;

acquiring a primary document candidate group including the first documents of the first document candidate group and the second documents of the second document candidate group;

calculating a fourth score indicating similarity between a passage of a document in the primary document candidate group and the user retrieval query by inputting the passage of the document in the primary document candidate group and the user retrieval query to a cross-encoder of cross-encoder type deep learning model;

calculating a fifth score indicating similarity between the key query information including the keyword of the user retrieval query and a keyword included in the passage of the document in the primary document candidate group using a score calculation algorithm;

calculating a weighted sum similarity score based on the fourth score and the fifth score and adjusting a ranking of documents in the primary document candidate group based on the weighted sum similarity score;

determining a summarization target document based on the adjusted ranking of the documents; and generating an abstractive summarization-based first summary through a first output layer of a trained document summarization model and an extractive summarization-based second summary through a second output layer of the trained document summarization model by inputting the determined summarization target document to the trained document summarization model.

8. An apparatus for summizing a document, comprising:

a memory storing instructions; and a hardware processor configured to execute the instructions to:

acquire a user inquiry vector from a user retrieval query, extract a key sentence of a passage of a document stored in a retrieval database from the passage of the document, calculate a first similarity score between the user inquiry vector and a sentence vector corresponding to the key sentence extracted from the passage of the document by inputting the user inquiry vector and the sentence vector to a bi-encoder of a bi-encoder type deep learning model, calculate a second similarity score between the user inquiry vector and a sentence vector corresponding to a sentence summarizing the passage of the document stored in the retrieval database, generate a question from the passage of the document stored in the retrieval database through a generation model, calculate a third similarity score between a question vector corresponding to the question generated from the passage stored in the retrieval database and the user inquiry vector, calculate a first weighted score based on the first similarity score, the second similarity score, and the third similarity score, determine a first document candidate group including first documents based on the calculated first weighted score, calculate a first score indicating similarity between the user retrieval query and a passage stored in the retrieval database through a phrase matching, calculate a second score indicating similarity between key query information including a keyword of the user retrieval query extracted through a user query analysis module and a keyword included in the passage stored in the retrieval database, calculate a third score indicating similarity between the user retrieval query and the passage stored in the retrieval database through a shingle matching, calculate a second weighted score based on the first score, the second score, and the third score, determine a second document candidate group including second documents based on the calculated second weighted score, acquire a primary document candidate group including the first documents of the first document candidate group and the second documents of the second document candidate group, calculate a fourth score indicating similarity between a passage of a document in the primary document candidate group and the user retrieval query by inputting the passage of the document in the primary document candidate group and the user retrieval query to a cross-encoder of cross-encoder type deep learning model, calculate a fifth score indicating similarity between the key query information including the keyword of the user retrieval query and a keyword included in the passage of the document in the primary document candidate group using a score calculation algorithm, calculate a weighted sum similarity score based on the fourth score and the fifth score and adjust a ranking of documents in the primary document candidate group based on the weighted sum similarity score, determine a summarization target document based on the adjusted ranking of the documents, and generate an abstractive summarization-based first summary through a first output layer of a trained document summarization model and an extractive summarization-based second summary through a second output layer of the trained document summarization model by inputting the determined summarization target document to the trained document summarization model.

9. The apparatus of claim 8, wherein the hardware processor is further configured to acquire the user inquiry vector in a unit of sentence from the user retrieval query.

10. The apparatus of claim 8, wherein the hardware processor is further configured to:

generate a question to specify the user retrieval query based on the user retrieval query using the generation model when the user retrieval query is not recognized, transmit the generated question to a user terminal, and receive a user retrieval query corresponding to the transmitted question from the user terminal.

11. The apparatus of claim 8, wherein the score calculation algorithm includes a BM25F score calculation algorithm.

12. The apparatus of claim 8, wherein the hardware processor is further configured to:

determine a document in order of the adjusted ranking among the documents included in the primary document candidate group as the summarization target document.

13. The apparatus of claim 8, wherein the hardware processor is further configured to:

input the determined summarization target document to an input layer of the trained document summarization model, acquire a first summarization vector through the first output layer of the trained document summarization model, generate the abstractive summarization-based first summary based on the first summarization vector, acquire a second summarization vector through the second output layer of the trained document summarization model, and generate the extractive summarization-based second summary based on the second summarization vector.

* * * * *